US008682913B1

(12) United States Patent
Betz

(10) Patent No.: US 8,682,913 B1
(45) Date of Patent: Mar. 25, 2014

(54) CORROBORATING FACTS EXTRACTED FROM MULTIPLE SOURCES

(75) Inventor: Jonathan T. Betz, Summit, NJ (US)

(73) Assignee: Google Inc., Mountain View, CA (US)

( * ) Notice: Subject to any disclaimer, the term of this patent is extended or adjusted under 35 U.S.C. 154(b) by 3144 days.

(21) Appl. No.: 11/097,688

(22) Filed: Mar. 31, 2005

(51) Int. Cl.
G06F 17/30 (2006.01)
G06F 7/00 (2006.01)

(52) U.S. Cl.
USPC ............ 707/755; 707/738; 707/701; 707/804

(58) Field of Classification Search
USPC ................................. 707/755, 738, 701, 804
See application file for complete search history.

(56) References Cited

U.S. PATENT DOCUMENTS

| | | |
|---|---|---|
| 5,010,478 A | 4/1991 | Deran ............................ 364/200 |
| 5,133,075 A | 7/1992 | Risch |
| 5,347,653 A | 9/1994 | Flynn et al. |
| 5,440,730 A | 8/1995 | Elmasri et al. |
| 5,475,819 A | 12/1995 | Miller et al. .............. 395/200.03 |
| 5,519,608 A | 5/1996 | Kupiec ..................... 364/419.08 |
| 5,546,507 A | 8/1996 | Staub |
| 5,560,005 A | 9/1996 | Hoover et al. .................. 395/600 |
| 5,574,898 A | 11/1996 | Leblang et al. ................ 395/601 |
| 5,675,785 A | 10/1997 | Hall et al. |
| 5,680,622 A | 10/1997 | Even |
| 5,694,590 A | 12/1997 | Thuraisingham et al. |
| 5,701,470 A | 12/1997 | Joy et al. |
| 5,717,911 A | 2/1998 | Madrid et al. |
| 5,717,951 A | 2/1998 | Yabumoto ..................... 395/831 |
| 5,724,571 A | 3/1998 | Woods |
| 5,778,373 A | 7/1998 | Levy et al. ..................... 707/100 |
| 5,778,378 A | 7/1998 | Rubin |
| 5,787,413 A | 7/1998 | Kauffman et al. |
| 5,793,966 A | 8/1998 | Amstein et al. |
| 5,802,299 A | 9/1998 | Logan et al. ............. 395/200.48 |
| 5,815,415 A | 9/1998 | Bentley et al. |
| 5,819,210 A | 10/1998 | Maxwell, III et al. |
| 5,819,265 A | 10/1998 | Ravin et al. |
| 5,822,743 A | 10/1998 | Gupta et al. ..................... 706/50 |
| 5,826,258 A | 10/1998 | Gupta et al. |
| 5,838,979 A | 11/1998 | Hart et al. |

(Continued)

FOREIGN PATENT DOCUMENTS

| | | |
|---|---|---|
| JP | 5-174020 A | 7/1993 |
| JP | 11-265400 A | 9/1999 |

(Continued)

OTHER PUBLICATIONS

Page, L., et al., "The PageRank Citation Ranking: Bringing Order to the Web," Technical Report, Stanford Univ., Stanford, CA, 1998.

(Continued)

Primary Examiner — Shew-Fen Lin
(74) Attorney, Agent, or Firm — Morgan, Lewis & Bockius LLP

(57) ABSTRACT

A method and system for corroborating facts extracted as attribute-value pairs from multiple sources. Facts associated with a common subject are identified and extracted from multiple sources. From the extracted facts, attributes satisfying a first corroboration requirement are identified. Attribute-value pairs satisfying a second corroboration requirement and having any of the identified attributes that satisfy the first corroboration requirement are identified. Predefined actions may be performed with respect to the identified attribute-value pairs and/or with respect to their status in a fact database.

21 Claims, 6 Drawing Sheets

(56) References Cited

U.S. PATENT DOCUMENTS

| | | | | |
|---|---|---|---|---|
| 5,909,689 | A | 6/1999 | Van Ryzin | |
| 5,920,859 | A | 7/1999 | Li | 707/5 |
| 5,943,670 | A | 8/1999 | Prager | 707/5 |
| 5,956,718 | A | 9/1999 | Prasad et al. | |
| 5,974,254 | A | 10/1999 | Hsu | |
| 5,987,460 | A | 11/1999 | Niwa et al. | 707/6 |
| 6,006,221 | A | 12/1999 | Liddy et al. | |
| 6,018,741 | A | 1/2000 | Howland et al. | |
| 6,038,560 | A * | 3/2000 | Wical | 707/5 |
| 6,044,366 | A | 3/2000 | Graffe et al. | 707/2 |
| 6,052,693 | A | 4/2000 | Smith et al. | 707/104 |
| 6,064,952 | A | 5/2000 | Imanaka et al. | |
| 6,073,130 | A | 6/2000 | Jacobson et al. | |
| 6,078,918 | A | 6/2000 | Allen et al. | |
| 6,112,203 | A | 8/2000 | Bharat et al. | 707/5 |
| 6,112,210 | A | 8/2000 | Nori et al. | |
| 6,122,647 | A * | 9/2000 | Horowitz et al. | 715/205 |
| 6,134,555 | A | 10/2000 | Chadha et al. | 707/102 |
| 6,138,270 | A | 10/2000 | Hsu | |
| 6,182,063 | B1 | 1/2001 | Woods | |
| 6,202,065 | B1 | 3/2001 | Wills | |
| 6,212,526 | B1 | 4/2001 | Chaudhuri et al. | 707/102 |
| 6,240,546 | B1 | 5/2001 | Lee et al. | 717/4 |
| 6,263,328 | B1 | 7/2001 | Coden et al. | |
| 6,263,358 | B1 | 7/2001 | Lee et al. | |
| 6,266,805 | B1 | 7/2001 | Nwana et al. | |
| 6,285,999 | B1 | 9/2001 | Page | 707/5 |
| 6,289,338 | B1 * | 9/2001 | Stoffel et al. | 707/3 |
| 6,311,194 | B1 | 10/2001 | Sheth et al. | |
| 6,314,555 | B1 | 11/2001 | Ndumu et al. | |
| 6,327,574 | B1 | 12/2001 | Kramer et al. | |
| 6,349,275 | B1 * | 2/2002 | Schumacher et al. | 704/8 |
| 6,377,943 | B1 | 4/2002 | Jakobsson | |
| 6,397,228 | B1 | 5/2002 | Lamburt et al. | |
| 6,438,543 | B1 | 8/2002 | Kazi et al. | |
| 6,470,330 | B1 | 10/2002 | Das et al. | |
| 6,473,898 | B1 | 10/2002 | Waugh et al. | 717/168 |
| 6,487,495 | B1 | 11/2002 | Gale et al. | |
| 6,502,102 | B1 | 12/2002 | Haswell et al. | |
| 6,519,631 | B1 | 2/2003 | Rosenschein et al. | |
| 6,556,991 | B1 | 4/2003 | Borkovsky | |
| 6,565,610 | B1 | 5/2003 | Wang et al. | |
| 6,567,846 | B1 | 5/2003 | Garg et al. | |
| 6,567,936 | B1 * | 5/2003 | Yang et al. | 714/37 |
| 6,572,661 | B1 | 6/2003 | Stern | 715/501.1 |
| 6,578,032 | B1 | 6/2003 | Chandrasekar et al. | |
| 6,584,464 | B1 | 6/2003 | Warthen | 707/4 |
| 6,584,646 | B2 | 7/2003 | Fujita | |
| 6,594,658 | B2 | 7/2003 | Woods | |
| 6,606,625 | B1 | 8/2003 | Muslea et al. | |
| 6,606,659 | B1 | 8/2003 | Hegli et al. | |
| 6,609,123 | B1 | 8/2003 | Cazemier et al. | |
| 6,636,742 | B1 | 10/2003 | Torkki et al. | |
| 6,643,641 | B1 | 11/2003 | Snyder | |
| 6,665,659 | B1 | 12/2003 | Logan | |
| 6,665,666 | B1 | 12/2003 | Brown et al. | 707/5 |
| 6,665,837 | B1 | 12/2003 | Dean et al. | 715/501.1 |
| 6,675,159 | B1 | 1/2004 | Lin et al. | |
| 6,684,205 | B1 | 1/2004 | Modha et al. | |
| 6,693,651 | B2 | 2/2004 | Biebesheimer et al. | |
| 6,704,726 | B1 | 3/2004 | Amouroux | |
| 6,738,767 | B1 | 5/2004 | Chung et al. | |
| 6,745,189 | B2 | 6/2004 | Schreiber | |
| 6,754,873 | B1 | 6/2004 | Law et al. | 715/501.1 |
| 6,763,496 | B1 | 7/2004 | Hennings et al. | |
| 6,799,176 | B1 | 9/2004 | Page | 707/5 |
| 6,804,667 | B1 | 10/2004 | Martin | 707/6 |
| 6,820,081 | B1 | 11/2004 | Kawai et al. | |
| 6,820,093 | B2 | 11/2004 | de la Huerga | |
| 6,823,495 | B1 | 11/2004 | Vedula et al. | 715/805 |
| 6,832,218 | B1 | 12/2004 | Emens et al. | |
| 6,845,354 | B1 | 1/2005 | Kuo et al. | |
| 6,850,896 | B1 | 2/2005 | Kelman et al. | 705/10 |
| 6,873,982 | B1 | 3/2005 | Bates et al. | |
| 6,873,993 | B2 | 3/2005 | Charlesworth et al. | |
| 6,886,005 | B2 | 4/2005 | Davis | 707/2 |
| 6,886,010 | B2 | 4/2005 | Kostoff | |
| 6,901,403 | B1 | 5/2005 | Bata et al. | 707/101 |
| 6,904,429 | B2 | 6/2005 | Sako et al. | |
| 6,957,213 | B1 | 10/2005 | Yuret | 707/4 |
| 6,963,880 | B1 | 11/2005 | Pingte et al. | |
| 6,965,900 | B1 | 11/2005 | Srinivasa et al. | |
| 7,003,506 | B1 | 2/2006 | Fisk et al. | |
| 7,003,522 | B1 | 2/2006 | Reynar et al. | 707/10 |
| 7,003,719 | B1 | 2/2006 | Rosenoff et al. | 715/500.1 |
| 7,007,228 | B1 | 2/2006 | Carro | |
| 7,013,308 | B1 | 3/2006 | Tunstall-Pedoe | |
| 7,020,662 | B2 | 3/2006 | Boreham et al. | |
| 7,043,521 | B2 | 5/2006 | Eitel | |
| 7,051,023 | B2 | 5/2006 | Kapur et al. | 707/5 |
| 7,076,491 | B2 | 7/2006 | Tsao | |
| 7,080,073 | B1 | 7/2006 | Jiang et al. | 707/7 |
| 7,080,085 | B1 | 7/2006 | Choy et al. | |
| 7,100,082 | B2 | 8/2006 | Little et al. | |
| 7,143,099 | B2 | 11/2006 | Leeheler-Moore et al. | 707/101 |
| 7,146,536 | B2 | 12/2006 | Bingham et al. | 714/26 |
| 7,158,980 | B2 | 1/2007 | Shen | |
| 7,162,499 | B2 | 1/2007 | Lees et al. | |
| 7,165,024 | B2 | 1/2007 | Glover et al. | |
| 7,174,504 | B2 | 2/2007 | Tsao | |
| 7,181,471 | B1 * | 2/2007 | Ibuki et al. | 1/1 |
| 7,194,380 | B2 * | 3/2007 | Barrow et al. | 702/181 |
| 7,197,449 | B2 | 3/2007 | Hu et al. | |
| 7,216,073 | B2 | 5/2007 | Lavi et al. | |
| 7,233,943 | B2 | 6/2007 | Modha et al. | |
| 7,260,573 | B1 | 8/2007 | Jeh et al. | |
| 7,263,565 | B2 | 8/2007 | Tawara et al. | |
| 7,277,879 | B2 | 10/2007 | Varadarajan | 707/1 |
| 7,302,646 | B2 | 11/2007 | Nomiyama et al. | |
| 7,305,380 | B1 | 12/2007 | Hoelzle et al. | |
| 7,325,160 | B2 | 1/2008 | Tsao | |
| 7,363,312 | B2 | 4/2008 | Goldsack | 707/102 |
| 7,376,895 | B2 | 5/2008 | Tsao | |
| 7,398,461 | B1 | 7/2008 | Broder et al. | |
| 7,409,381 | B1 | 8/2008 | Steel et al. | |
| 7,412,078 | B2 | 8/2008 | Kim | |
| 7,418,736 | B2 | 8/2008 | Ghanea-Hercock | |
| 7,472,182 | B1 | 12/2008 | Young et al. | |
| 7,483,829 | B2 | 1/2009 | Murakami et al. | |
| 7,493,308 | B1 | 2/2009 | Bair, Jr. et al. | |
| 7,493,317 | B2 * | 2/2009 | Geva | 707/3 |
| 7,587,387 | B2 | 9/2009 | Hogue | |
| 7,644,076 | B1 | 1/2010 | Ramesh et al. | |
| 7,672,971 | B2 | 3/2010 | Betz et al. | |
| 7,685,201 | B2 | 3/2010 | Zeng et al. | |
| 7,698,303 | B2 | 4/2010 | Goodwin et al. | |
| 7,716,225 | B1 | 5/2010 | Dean et al. | |
| 7,747,571 | B2 | 6/2010 | Boggs | |
| 7,756,823 | B2 | 7/2010 | Young et al. | |
| 7,797,282 | B1 | 9/2010 | Kirshenbaum et al. | |
| 7,885,918 | B2 | 2/2011 | Statchuk | |
| 7,917,154 | B2 | 3/2011 | Fortescue et al. | |
| 7,953,720 | B1 | 5/2011 | Rohde et al. | |
| 8,024,281 | B2 | 9/2011 | Proctor et al. | |
| 8,065,290 | B2 | 11/2011 | Hogue | |
| 8,108,501 | B2 | 1/2012 | Birnie et al. | |
| 2001/0021935 | A1 | 9/2001 | Mills | |
| 2002/0022956 | A1 | 2/2002 | Ukrainczyk et al. | |
| 2002/0038307 | A1 | 3/2002 | Obradovic et al. | 707/102 |
| 2002/0042707 | A1 * | 4/2002 | Zhao et al. | 704/9 |
| 2002/0065845 | A1 | 5/2002 | Naito et al. | 707/500.1 |
| 2002/0073115 | A1 | 6/2002 | Davis | |
| 2002/0083039 | A1 * | 6/2002 | Ferrari et al. | 707/1 |
| 2002/0087567 | A1 | 7/2002 | Spiegler et al. | |
| 2002/0107861 | A1 | 8/2002 | Clendinning et al. | |
| 2002/0147738 | A1 | 10/2002 | Reader | |
| 2002/0169770 | A1 | 11/2002 | Kim et al. | 707/5 |
| 2002/0174099 | A1 | 11/2002 | Raj et al. | |
| 2002/0178448 | A1 | 11/2002 | Te Kiefte et al. | 725/46 |
| 2002/0194172 | A1 | 12/2002 | Schreiber | |
| 2003/0018652 | A1 * | 1/2003 | Heckerman et al. | 707/104.1 |
| 2003/0058706 | A1 | 3/2003 | Okamoto et al. | |
| 2003/0069880 | A1 | 4/2003 | Harrison et al. | |
| 2003/0078902 | A1 | 4/2003 | Leong et al. | 706/59 |

(56) References Cited

U.S. PATENT DOCUMENTS

| | | |
|---|---|---|
| 2003/0088607 A1 | 5/2003 | Ruellan et al. |
| 2003/0097357 A1 | 5/2003 | Ferrari et al. |
| 2003/0120644 A1 | 6/2003 | Shirota |
| 2003/0120675 A1 | 6/2003 | Stauber et al. ............... 707/100 |
| 2003/0126102 A1 | 7/2003 | Borthwick |
| 2003/0126152 A1 | 7/2003 | Rajak |
| 2003/0149567 A1 | 8/2003 | Schmitz et al. .............. 704/270 |
| 2003/0149699 A1 | 8/2003 | Tsao |
| 2003/0154071 A1 | 8/2003 | Shreve ............... 704/9 |
| 2003/0167163 A1 | 9/2003 | Glover et al. |
| 2003/0177110 A1 | 9/2003 | Okamoto et al. ................ 707/3 |
| 2003/0182310 A1 | 9/2003 | Charnock et al. |
| 2003/0195872 A1 | 10/2003 | Senn |
| 2003/0195877 A1 | 10/2003 | Ford et al. ......... 707/3 |
| 2003/0196052 A1 | 10/2003 | Bolik et al. |
| 2003/0204481 A1 | 10/2003 | Lau |
| 2003/0208354 A1 | 11/2003 | Lin et al. |
| 2004/0003067 A1 | 1/2004 | Ferrin ............... 709/223 |
| 2004/0015481 A1 | 1/2004 | Zinda |
| 2004/0024739 A1 | 2/2004 | Copperman et al. ............ 707/1 |
| 2004/0049503 A1 | 3/2004 | Modha et al. |
| 2004/0059726 A1 | 3/2004 | Hunter et al. |
| 2004/0064447 A1 | 4/2004 | Simske et al. |
| 2004/0069880 A1 | 4/2004 | Samelson et al. ............. 241/74 |
| 2004/0088292 A1 | 5/2004 | Dettinger et al. |
| 2004/0107125 A1 | 6/2004 | Guheen et al. .................. 705/7 |
| 2004/0122844 A1 | 6/2004 | Malloy et al. |
| 2004/0122846 A1 | 6/2004 | Chess et al. |
| 2004/0123240 A1 | 6/2004 | Gerstl et al. |
| 2004/0128624 A1 | 7/2004 | Arellano et al. |
| 2004/0143600 A1 | 7/2004 | Musgrove et al. |
| 2004/0153456 A1 | 8/2004 | Charnock et al. |
| 2004/0167870 A1 | 8/2004 | Wakefield et al. ............... 707/1 |
| 2004/0177015 A1 | 9/2004 | Galai et al. |
| 2004/0177080 A1 | 9/2004 | Doise et al. |
| 2004/0199923 A1 | 10/2004 | Russek |
| 2004/0243552 A1 | 12/2004 | Titemore et al. |
| 2004/0243614 A1 | 12/2004 | Boone et al. |
| 2004/0255237 A1 | 12/2004 | Tong ............... 715/501.1 |
| 2004/0260979 A1 | 12/2004 | Kumai |
| 2004/0267700 A1 | 12/2004 | Dumais et al. |
| 2004/0268237 A1 | 12/2004 | Jones et al. |
| 2005/0076012 A1 | 4/2005 | Manber et al. |
| 2005/0080613 A1 | 4/2005 | Colledge et al. |
| 2005/0086211 A1 | 4/2005 | Mayer |
| 2005/0086222 A1* | 4/2005 | Wang et al. ............ 707/5 |
| 2005/0086251 A1 | 4/2005 | Hatscher et al. |
| 2005/0097150 A1 | 5/2005 | McKeon et al. |
| 2005/0108630 A1 | 5/2005 | Wasson et al. |
| 2005/0125311 A1 | 6/2005 | Chidiac et al. ............. 705/28 |
| 2005/0149576 A1 | 7/2005 | Marmaros et al. ............ 707/200 |
| 2005/0149851 A1 | 7/2005 | Mittal ............... 715/501.1 |
| 2005/0187923 A1 | 8/2005 | Cipollone ............ 707/3 |
| 2005/0188217 A1 | 8/2005 | Ghanea-Hercock |
| 2005/0240615 A1 | 10/2005 | Barsness et al. |
| 2005/0256825 A1 | 11/2005 | Dettinger et al. |
| 2006/0036504 A1 | 2/2006 | Allocca et al. ................ 705/26 |
| 2006/0041597 A1 | 2/2006 | Conrad et al. |
| 2006/0047691 A1 | 3/2006 | Humphreys et al. |
| 2006/0047838 A1 | 3/2006 | Chauhan |
| 2006/0053171 A1 | 3/2006 | Eldridge et al. |
| 2006/0053175 A1 | 3/2006 | Gardner et al. |
| 2006/0064411 A1 | 3/2006 | Gross et al. |
| 2006/0074824 A1 | 4/2006 | Li ............... 706/20 |
| 2006/0074910 A1 | 4/2006 | Yun et al. ............ 707/7 |
| 2006/0085465 A1 | 4/2006 | Nori et al. |
| 2006/0112110 A1 | 5/2006 | Maymir-Ducharme et al. |
| 2006/0123046 A1 | 6/2006 | Doise et al. |
| 2006/0136585 A1 | 6/2006 | Mayfield et al. |
| 2006/0143227 A1 | 6/2006 | Helm et al. |
| 2006/0143603 A1 | 6/2006 | Kalthoff et al. |
| 2006/0152755 A1 | 7/2006 | Curtis et al. ............... 358/1.15 |
| 2006/0167991 A1 | 7/2006 | Heikes et al. |
| 2006/0224582 A1 | 10/2006 | Hogue |
| 2006/0238919 A1 | 10/2006 | Bradley |
| 2006/0242180 A1 | 10/2006 | Graf et al. |
| 2006/0248045 A1 | 11/2006 | Toledano et al. |
| 2006/0248456 A1 | 11/2006 | Bender et al. |
| 2006/0253418 A1 | 11/2006 | Charnock et al. |
| 2006/0259462 A1 | 11/2006 | Timmons |
| 2006/0277169 A1 | 12/2006 | Lunt et al. |
| 2006/0288268 A1 | 12/2006 | Srinivasan et al. |
| 2006/0293879 A1 | 12/2006 | Zhao et al. |
| 2007/0005593 A1 | 1/2007 | Self et al. |
| 2007/0005639 A1 | 1/2007 | Gaussier et al. ............ 707/103 |
| 2007/0016890 A1* | 1/2007 | Brunner et al. ............... 717/107 |
| 2007/0038610 A1 | 2/2007 | Omoigui |
| 2007/0043708 A1 | 2/2007 | Tunstall-Pedoe |
| 2007/0055656 A1 | 3/2007 | Tunstall-Pedoe |
| 2007/0073768 A1 | 3/2007 | Goradia ............... 707/104.1 |
| 2007/0094246 A1 | 4/2007 | Dill et al. ............ 707/4 |
| 2007/0100814 A1 | 5/2007 | Lee et al. |
| 2007/0130123 A1 | 6/2007 | Majumder ............ 707/3 |
| 2007/0143282 A1 | 6/2007 | Betz et al. |
| 2007/0143317 A1 | 6/2007 | Hogue et al. |
| 2007/0150800 A1* | 6/2007 | Betz et al. ............... 715/500 |
| 2007/0198451 A1 | 8/2007 | Kehlenbeck et al. |
| 2007/0198480 A1 | 8/2007 | Hogue et al. |
| 2007/0198481 A1 | 8/2007 | Hogue et al. |
| 2007/0198503 A1 | 8/2007 | Hogue et al. |
| 2007/0198577 A1 | 8/2007 | Betz et al. |
| 2007/0198598 A1 | 8/2007 | Betz et al. |
| 2007/0198600 A1 | 8/2007 | Betz |
| 2007/0203867 A1 | 8/2007 | Hogue et al. |
| 2007/0208773 A1 | 9/2007 | Tsao |
| 2007/0271268 A1 | 11/2007 | Fontoura et al. ............... 707/6 |
| 2008/0071739 A1 | 3/2008 | Kumar et al. |
| 2008/0104019 A1 | 5/2008 | Nath |
| 2009/0006359 A1 | 1/2009 | Liao |
| 2009/0119255 A1 | 5/2009 | Frank et al. |

FOREIGN PATENT DOCUMENTS

| | | | |
|---|---|---|---|
| JP | 2002-157276 A | 5/2002 | |
| JP | 2002-540506 A | 11/2002 | |
| JP | 2003-281173 A | 10/2003 | |
| WO | WO 01/27713 | 4/2001 | |
| WO | WO 2004/114163 | 12/2004 | ............ G06F 17/30 |
| WO | WO 2006/104951 | 10/2006 | ............ G06F 17/30 |

OTHER PUBLICATIONS

Haveliwala, T., "Topice Sensitive PageRank," *Proceedings of the Eleventh Int'l World Wide Web Conf.*, Honolulu, Hawaii, May 2002.

Richardson, M., et al., "The Intelligent Surfer: Probabilistic Combination of Link and Content Information in PageRank," vol. 14, MIT Press, Cambridge, MA, 2002.

Jeh, G., et al., "Scaling Personalized Web Search," *Proceedings of the 12th Int'l World Wide Web Conf Budapest*, Hungary, May 20-24, 2003.

Brin, S., et al., "The Anatomy of a Large Scale Hypertextual Search Engine," *Proceedings of the 7th Int'l World Wide Web Conf.*, Brisbane, Australia, Apr. 14-18, 1998.

Andritsos, Information-theoretic tools for mining database structure from large data sets, Jun. 13-18, 2004, 12 pgs.

Betz, Examiner's Answer, U.S. Appl. No. 11/394,414, Jan. 24, 2011, 31 pgs.

Betz, Notice of Allowance, U.S. Appl. No. 11/142,740, Apr. 16, 2009, 7 pgs.

Betz, Notice of Allowance, U.S. Appl. No. 11/142,765, Jul. 1, 2010, 14 pgs.

Betz, Notice of Allowance, U.S. Appl. No. 11/341,069, Sep. 8, 2008, 6 pgs.

Betz, Notice of Allowance, U.S. Appl. No. 12/939,981, Aug. 11, 2011, 7 pgs.

Betz, Notice of Allowance, U.S. Appl. No. 12/939,981, Apr. 26, 2011, 11 pgs.

Betz, Office Action, U.S. Appl. No. 11/142,740, Aug. 13, 2007, 12 pgs.

Betz, Office Action, U.S. Appl. No. 11/142,740, May 17, 2007, 12 pgs.

(56) References Cited

OTHER PUBLICATIONS

Betz, Office Action, U.S. Appl. No. 11/142,740, Jul. 23, 2008, 11 pgs.
Betz, Office Action, U.S. Appl. No. 11/142,740, Dec. 26, 2007, 12 pgs.
Betz, Office Action, U.S. Appl. No. 11/142,740, Jan. 27, 2009, 11 pgs.
Betz, Office Action, U.S. Appl. No. 11/142,740, Apr. 30, 2008, 14 pgs.
Betz, Office Action, U.S. Appl. No. 11/142,765, Jan. 8, 2010, 17 pgs.
Betz, Office Action, U.S. Appl. No. 11/142,765, May 9, 2008, 20 pgs.
Betz, Office Action, U.S. Appl. No. 11/142,765, Jan. 17, 2008, 16 pgs.
Betz, Office Action, U.S. Appl. No. 11/142,765, Oct. 17, 2007, 14 pgs.
Betz, Office Action, U.S. Appl. No. 11/142,765, Oct. 17, 2008, 17 pgs.
Betz, Office Action, U.S. Appl. No. 11/142,765, Jun. 18, 2007, 13 pgs.
Betz, Office Action, U.S. Appl. No. 11/142,765, Apr. 28, 2009, 16 pgs.
Betz, Office Action, U.S. Appl. No. 11/341,069, Apr. 1, 2008, 8 pgs.
Betz, Office Action, U.S. Appl. No. 11/394,414, Mar. 5, 2010, 24 pgs.
Betz, Office Action, U.S. Appl. No. 11/394,414, Sep. 15, 2009, 16 pgs.
Betz, Office Action, U.S. Appl. No. 11/394,552, Apr. 1, 2008, 14 pgs.
Betz, Office Action, U.S. Appl. No. 11/394,552, Aug. 4, 2010, 19 pgs.
Betz, Office Action, U.S. Appl. No. 11/394,552, Feb. 8, 2011, 22 pgs.
Betz, Office Action, U.S. Appl. No. 11/394,552, Jul. 8, 2011, 13 pgs.
Betz, Office Action, U.S. Appl. No. 11/394,552, Apr. 11, 2012, 15 pgs.
Betz, Office Action, U.S. Appl. No. 11/394,552, Nov. 12, 2008, 11 pgs.
Betz, Office Action, U.S. Appl. No. 11/394,552, Jan. 13, 2010, 15 pgs.
Betz, Office Action, U.S. Appl. No. 11/394,552, Mar. 13, 2009, 12 pgs.
Betz, Office Action, U.S. Appl. No. 11/394,552, Apr. 23, 2013, 21 pgs.
Betz, Office Action, U.S. Appl. No. 11/394,552, Sep. 24, 2012, 21 pgs.
Betz, Office Action, U.S. Appl. No. 12/939,981, Dec. 9, 2010, 12 pgs.
Betz, Office Action, U.S. Appl. No. 13/302,755, Mar. 25, 2012, 15 pgs.
Chen, A scheme for inference problems using rough sets and entropy, Aug. 13-Sep 3, 2005, 10 pgs.
Cover, Entropy, relative entropy and mutual information, Chapter 2 Elements of Information Theory, 1991, 13 pgs.
Dean, Using design recovery techniques to transform legacy systems, 2001, 10 pgs.
Etzioni, Unsupervised named-entity extraction from the web: an experimental study, Feb. 28, 2005, 42 pgs.
Gigablast, Web/Directory, printed Aug. 24, 2010, 1 pg.
Gilster, P., "Get fast answers, easily, " The News Observer, May 13, 2003, 2 pgs.
Google Inc., ISR/WO, PCT/US2006/010965, Jul. 5, 2006, 7 pgs.
Google Inc., Office Action, CA 2,610,208, Sep. 21, 2011, 3 pgs.
Google Inc., Office Action, CA 2603085, Sep. 18, 2012, 2 pgs.
Google Inc., Office Action, EP 06784449.8, Mar. 26, 2012, 7 pgs.
Google Inc., Office Action, JP 2008-504204, Oct. 12, 2011, 4 pgs.
Hogue, Examiner's Answer, U.S. Appl. No. 11/142,748, Oct. 3, 2011, 23 pgs.
Hogue, Notice of Allowance, U.S. Appl. No. 11/097,689, Apr. 30, 2009, 8 pgs.
Hogue, Notice of Allowance, U.S. Appl. No. 11/356,837, Jan. 6, 2012, 12 pgs.
Hogue, Notice of Allowance, U.S. Appl. No. 11/356,837, Apr. 27, 2012, 7 pgs.
Hogue, Notice of Allowance, U.S. Appl. No. 12/546,578, Jan. 6, 2011, 8 pgs.
Hogue, Notice of Allowance, U.S. Appl. No. 12/546,578, Jul. 12, 2011, 10 pgs.
Hogue, Notice of Allowance, U.S. Appl. No. 13/206,457, Mar. 14, 2012, 9 pgs.
Hogue, Notice of Allowance, U.S. Appl. No. 13/549,361, Jun. 26, 2013, 8 pgs.
Hogue, Notice of Allowance, U.S. Appl. No. 13/603,354, Jun. 26, 2013, 8 pgs.
Hogue, Office Action, U.S. Appl. No. 11/097,689, Oct. 3, 2008, 13 pgs.
Hogue, Office Action, U.S. Appl. No. 11/097,689, Apr. 9, 2008, 11 pgs.
Hogue, Office Action, U.S. Appl. No. 11/097,689, Jun. 21, 2007, 9 pgs.
Hogue, Office Action, U.S. Appl. No. 11/097,689, Nov. 27, 2007, 10 pgs.
Hogue, Office Action, U.S. Appl. No. 11/142,748, Dec. 7, 2007, 13 pgs.
Hogue, Office Action, U.S. Appl. No. 11/142,748, Jul. 13, 2010, 12 pgs.
Hogue, Office Action, U.S. Appl. No. 11/142,748, Aug. 17, 2009, 14 pgs.
Hogue, Office Action, U.S. Appl. No. 11/142,748, Nov. 17, 2010, 14 pgs.
Hogue, Office Action, U.S. Appl. No. 11/142,748, May 18, 2007, 9 pgs.
Hogue, Office Action, U.S. Appl. No. 11/142,748, Jul. 22, 2008, 18 pgs.
Hogue, Office Action, U.S. Appl. No. 11/142,748, Aug. 23, 2007, 13 pgs.
Hogue, Office Action, U.S. Appl. No. 11/142,748, Jan. 27, 2009, 17 pgs.
Hogue, Office Action, U.S. Appl. No. 11/356,837, Jun. 3, 2011, 18 pgs.
Hogue, Office Action, U.S. Appl. No. 11/356,837, Aug. 4, 2010, 20 pgs.
Hogue, Office Action, U.S. Appl. No. 11/356,837, Feb. 8, 2011, 14 pgs.
Hogue, Office Action, U.S. Appl. No. 11/356,837, May 11, 2009, 18 pgs.
Hogue, Office Action, U.S. Appl. No. 11/356,837, Feb. 19, 2010, 20 pgs.
Hogue, Office Action, U.S. Appl. No. 11/356,837, Mar. 21, 2008, 15 pgs.
Hogue, Office Action, U.S. Appl. No. 11/356,837, Oct. 27, 2009, 20 pgs.
Hogue, Office Action, U.S. Appl. No. 11/356,837, Sep. 30, 2008, 20 pgs.
Hogue, Office Action, U.S. Appl. No. 11/399,857, Mar. 1, 2012, 25 pgs.
Hogue, Office Action, U.S. Appl. No. 11/399,857, Mar. 3, 2011, 15 pgs.
Hogue, Office Action, U.S. Appl. No. 11/399,857, Jan. 5, 2009, 21 pgs.
Hogue, Office Action, U.S. Appl. No. 11/399,857, Jun. 8, 2009, 14 pgs.
Hogue, Office Action, U.S. Appl. No. 11/399,857, Sep. 13, 2010, 13 pgs.
Hogue, Office Action, U.S. Appl. No. 11/399,857, Jun. 24, 2011, 14 pgs.
Hogue, Office Action, U.S. Appl. No. 11/399,857, Dec. 28, 2009, 11 pgs.
Hogue, Office Action, U.S. Appl. No. 11/399,857, Mar. 31, 2008, 23 pgs.
Hogue, Office Action, U.S. Appl. No. 12/546,578, Aug. 4, 2010, 10 pgs.
Hogue, Office Action, U.S. Appl. No. 13/206,457, Oct. 28, 2011, 6 pgs.
Hogue, Office Action, U.S. Appl. No. 13/549,361, Oct. 4, 2012, 18 pgs.
Hogue, Office Action, U.S. Appl. No. 13/549,361, Mar. 6, 2013, 13 pgs.
Hogue, Office Action, U.S. Appl. No. 13/603,354, Jan. 9, 2013, 5 pgs.

(56) References Cited

OTHER PUBLICATIONS

Hsu, C. "Finite-state transducers for semi-structured text mining," IJCA Workshop on Text Mining: Foundations, Techniques and Applications, 1999, 12 pgs.
Ilyas, Rank-aware query optimization, Jun. 13-18, 2004, 12 pgs.
Koeller, Approximate matching of textual domain attributes for information source integration, Jun. 17, 2005, 10 pgs.
Kosala, Web mining research, Jul. 2000, 14 pgs.
Laroco, Notice of Allowance, U.S. Appl. No. 11/551,657, May 13, 2011, 8 pgs.
Laroco, Notice of Allowance, U.S. Appl. No. 11/551,657, Sep. 28, 2011, 8 pgs.
Laroco, Notice of Allowance, U.S. Appl. No. 13/364,244, Aug. 6, 2013, 6 pgs.
Laroco, Office Action, U.S. Appl. No. 11/551,657, Aug. 1, 2008, 15 pgs.
Laroco, Office Action, U.S. Appl. No. 11/551,657, Aug. 13, 2009, 16 pgs.
Laroco, Office Action, U.S. Appl. No. 11/551,657, Nov. 17, 2010, 20 pgs.
Laroco, Office Action, U.S. Appl. No. 11/551,657, Feb. 24, 2010, 17 pgs.
Laroco, Office Action, U.S. Appl. No. 11/551,657, Jan. 28, 2009, 17 pgs.
Laroco, Office Action, U.S. Appl. No. 13/364,244, Jan. 30, 2013, 8 pgs.
Lin, Question answering from the web using knowledge annotation and knowledge mining techniques, Nov. 3-8, 2003, 8 pgs.
Merriam Webster Dictionary defines "normalize" as"To make conform to or reduce to a norm or standard", 1865, 2 pgs.
Merriam Webster Dictionary defines "value" as "A numerical quantity that is assigned or is determined by . . . ", 1300, 2 pgs.
Microsoft Computer Dictionary defines "normalize" as "adjust number within specific range", May 1, 2002, 4 pgs.
Microsoft Computer Dictionary defines "quantity" as a "number", May 1, 2002, 4 pgs.
Microsoft Computer Dictionary defines "value" as a "quantity", May 1, 2002, 4 pgs.
Nadeau, Unspervised named-entity recognition: generating gazetteers and resolving ambiguity, Aug. 1, 2006, 12 pgs.
Nyberg, The JAVELIN question-answering system at TREC 2003, Nov. 18-21, 2003, 9 pgs.
Ogden, Improving cross-language text retrieval with human interactions, Jan. 2000, 9 pgs.
Plaisant, Interface and data architecture for query preview in networked information systems, Jul. 1999, 28 pgs.
Rohde, Notice of Allowance, U.S. Appl. No. 11/097,690, Dec. 23, 2010, 8 pgs.
Rohde, Office Action, U.S. Appl. No. 11/097,690, May 1, 2008, 21 pgs.
Rohde, Office Action, U.S. Appl. Nov. 11/097,690, Jun. 9, 2010, 11 pgs.
Rohde, Office Action, U.S. Appl. No. 11/097,690, Oct. 15, 2008, 22 pgs.
Rohde, Office Action, U.S. Appl. No. 11/097,690, Aug. 27, 2009, 13 pgs.
Rohde, Office Action, U.S. Appl. No. 11/097,690, Apr. 28, 2009, 9 pgs.
Rohde, Office Action, U.S. Appl. No. 11/097,690, Sep. 28, 2007, 17 pgs.
Shamsi, Notice of Allowance, U.S. Appl. No. 11/781,891, Oct. 25, 2010, 7 pgs.
Shamsi, Notice of Allowance, U.S. Appl. No. 11/781,891, May 27, 2010, 6 pgs.
Shamsi, Office Action, U.S. Appl. No. 11/781,891, Nov. 16, 2009, 10 pgs.
Shamsi, Office Action, U.S. Appl. No. 13/171,296, Apr. 3, 2013, 7 pgs.
Vespe, Notice of Allowance, U.S. Appl. No. 11/686,217, Aug. 27, 2012, 11 pgs.
Vespe, Notice of Allowance, U.S. Appl. No. 11/745,605, Jun. 13, 2011, 9 pgs.
Vespe, Notice of Allowance, U.S. Appl. No. 11/745,605, Sep. 22, 2011, 9 pgs.
Vespe, Notice of Allowance, U.S. Appl. No. 11/745,605, Mar. 28, 2012, 10 pgs.
Vespe, Office Action, U.S. Appl. No. 11/686,217, Sep. 10, 2010, 14 pgs.
Vespe, Office Action, U.S. Appl. No. 11/686,217, Jan. 26, 2012, 12 pgs.
Vespe, Office Action, U.S. Appl. No. 11/686,217, Mar. 26, 2010, 13 pgs.
Vespe, Office Action, U.S. Appl. No. 11/745,605, Apr. 8, 2010, 15 pgs.
Vespe, Office Action, U.S. Appl. No. 11/745,605, Jul. 30, 2009, 17 pgs.
Wirzenius, C preprocessor trick for implementing similar data types, Jan. 17, 2009, 9 pgs.
Zhao, Corroborate and learn facts from the web, Aug. 12-15, 2007, 9 pgs.
Zhao, Notice of Allowance, U.S. Appl. No. 11/394,610, May 11, 2009, 15 pgs.
Zhao, Office Action, U.S. Appl. No. 11/142,853, Oct. 2, 2009, 10 pgs.
Zhao, Office Action, U.S. Appl. No. 11/142,853, Sep. 5, 2008, 9 pgs.
Zhao, Office Action, U.S. Appl. No. 11/142,853, Mar. 17, 2009, 9 pgs.
Zhao, Office Action, U.S. Appl. No. 11/142,853, Jan. 25, 2008, 7 pgs.
Zhao, Office Action, U.S. Appl. No. 11/394,610, Apr. 1, 2008, 18 pgs.
Zhao, Office Action, U.S. Appl. No. 11/394,610, Nov. 13, 2008, 18 pgs.
Zhao, Office Action, U.S. Appl. No. 11/941,382, Sep. 8, 2011, 28 pgs.
Zhao, Office Action, U.S. Appl. No. 11/941,382, Aug. 12, 2010, 23 pgs.
Zhao, Office Action, U.S. Appl. No. 11/941,382, May 24, 2012, 26 pgs.
Zhao, Office Action, U.S. Appl. No. 11/941,382, Nov. 26, 2012, 24 pgs.
Zhao, Office Action, U.S. Appl. No. 11/941,382, Jan. 27, 2011, 24 pgs.
Zhao, Office Action, U.S. Appl. No. 11/941,382, Dec. 29, 2009, 25 pgs.
Betz, Notice of Allowance, U.S. Appl. No. 13/302,755, Aug. 28, 2013, 6 pgs.
Hogue, Notice of Allowance, U.S. Appl. No. 13/549,361, Oct. 2, 2013, 9 pgs.
Zhao, Office Action, U.S. Appl. No. 11/941,382, Sep. 27, 2013, 30 pgs.
Agichtein, E., et al., "Snowball Extracting Relations from Large Plain-Text Collections," Columbia Univ. Computer Science Dept. Technical Report CUCS-033-99, Dec. 1999, pp. 1-13.
Brill, E., et al., "An Analysis of the AskMSR Question-Answering System," Proceedings of the Conference of Empirical Methods in Natural Language Processing (EMNLP), Jul. 2002, pp. 257-264.
Brin, S., Extracting Patterns and Relations from the World Wide Web, 1999, 12 pages.
Bunescu, R., et al., "Using Encyclopedia Knowledge for Named Entity Disambiguation," Department of Computer Sciences, University of Texas, retrieved from internet Dec. 28, 2006, 8 pages.
Chang, C., et al., "IEPAD: Information Extraction Based on Pattern Discovery," WWW 10 '01, ACM, May 1-5, 2001, pp. 681-688.
Chu-Carroll, J., et al., "A Multi-Strategy and Multi-Source Approach to Question Answering," 2006, 8 pages.
Craswell, N., et al., "Effective Site Finding using Link Anchor Information," SIGIR '01, Sep. 9-12, 2001, pp. 250-257.
Dean, J., et al., "MapReduce: Simplified Data Processing on Large Clusters," OSDI, 2004, pp. 1-13.
Dong, X., et al., "Reference Reconciliation in Complex Information Spaces," SIGACM-SIGMOD, 2005, 12 pages.
Downey, D., et al., "Learning Text Patterns for Web Information Extraction and Assessment," American Association for Artificial Intelligence, 2002, 6 pages.

(56) References Cited

OTHER PUBLICATIONS

Etzioni, O., et al., "Web-scale Information Extraction in KnowItAll (Preliminary Results)," WWW2004, ACM May 17-20, 2004, 11 pages.
Freitag, D., et al., "Boosted Wrapper Induction," American Association for Artificial Intelligence, 2000, 7 pages.
Gao, X., et al., "Learning Information Extraction Patterns from Tabular Web Pages Without Manual Labelling," Proceedings of IEEE/WIC Int'l Conf. on Web Intelligence (WI'03), Oct. 13-17, 2003, pp. 495-498.
Gray, R.M., "Entropy and Information Theory," Springer-Verlag, New York, NY, 1990, pp. 17-46.
Guha, R., "Object Co-Identification on the Semantic Web," WWW2004, ACM, May 17-22, 2004, 9 pages.
Guha, R., et al., "Disambiguating People in Search," World Wide Web Conference, May 17-22, 2004, 9 pages.
Hogue, A. W., Tree Pattern Inference and Matching for Wrapper Induction on the World Wide Web, Master of Engineering in Electrical Engineering and Computer Science, Massachusetts Institute of Technology, Jun. 2004, pp. 3-106.
"Information Entropy," Wikipedia, The Free Encyclopedia, Retrieved on May 3, 2006, pp. 1-9.
"Information Theory," Wikipedia, The Free Encyclopedia,: Retrieved on May 3, 2006, pp. 1-12.
International Search Report and Written Opinion for International Application No. PCT/US2007/61156, mailed Feb. 11, 2008, 7 pages.
International Search Report and Written Opinion for International Application No. PCT/US2006/019807, mailed Dec. 18, 2006, 4 pages.
International Search Report and Written Opinion for International Application No. PCT/US2006/07639, mailed Sep. 13, 2006, 6 pages.
Ji, H., et al., "Re-Ranking Algorithms for Name Tagging," Workshop on Computationally Hard Problems and Joint Inference in Speech and Language Processing, Jun. 2006, 8 pages.
Jones, R., et al., Bootstrapping for Text Learning Tasks, 1999, 12 pages.
Kolodner, J., "Indexing and Retrieval Strategies for Natural Language Fact Retrieval," ACM Trans. Database Syst. 8.3., Sep. 1983, 434-464.
Kosseim, L., et al., "Answer Formulation for Question-Answering," 11 pages, Oct. 1, 2007.
Liu, B. et al., "Mining Data Records in Web Pages," Conference 2000, ACM, 2000, pp. 1-10.
MacKay, D.J.C., "Information Theory, Inference and Learning Algorithms," Cambridge University Press, 2003, pp. 22-33, 138-140.
Mann, G. et al., "Unsupervised Personal Name Disambiguation," Proceedings of the Seventy Conference on Natural Language Learning at HLT-NAACL, 2003, 8 pages.
McCallum, A., et al., "Object Consolidation by Graph Partitioning with a Conditionally-Trained Distance Metric,"SIGKDDD 03, ACM, Aug. 24-27, 2003, 6 pages.
Mihalcea, R., et al., PageRank on Semantic Networks, with Application to Word Sense Disambiguation, Proceedings of the 20th International Conference on Computational Linguistics, Aug. 23-27, 2004, 7 pages.
Mihalcea, R., et al., "TextRank: Bringing Order into Texts," Proceedings of the Conference on Empirical Methods in Natural Language Processing, Jul. 2004, 8 pages.
Pawson, D., "Sorting and Grouping," www.dpawson.co.uk/xsl/sect2/N6280.html>, Feb. 7, 2004, pp. 1-19.
Prager, J. et al., "IBM's Piquant in TREC2003," 2003, 10 pages.
Prager, J., et al., "Question Answering Using Constraint Satisfaction: QA-by-Dossier-with-Constraints," 2004, 8 pages.
Ramakrishnan, G., et al., "Is Question Answering an Acquired Skill?" WWW2004, ACM May 17, 2004, pp. 111-120.
Richardson, M., et al., "Beyond Page Rank: Machine Learning for Static Ranking," International World Wide Web Conference Committee, May 23, 2006, 9 pages.
Rioloff, E., et al., "Learning Dictionaries for Information Extraction by Multi-Level Bootstrapping," American Association for Artificial Intelligence, 1999, 6 pages.
Shannon, C.E., et al., "A Mathematical Theory of Communication," The Bell System Technical Journal, vol. 27, Jul. Oct. 1948, pp. 1-55.
Sun Microsystems, "Attribute Names," http://java.sun.com/products/jndi/tutorial/basics/directory/attrnames.html>, Feb. 17, 2004, pp. 1-2.
Wang, Y., et al., "C4-2: Combining Link and Contents in Clustering Web Search to Improve Information Interpretation," The University of Tokyo, 2002, pp. 1-9.

\* cited by examiner

CORROBORATING FACTS EXTRACTED FROM MULTIPLE SOURCES

RELATED APPLICATIONS

This application is related to the following applications, each of which is hereby incorporated by reference:

U.S. patent application Ser. No. 11/097,676, "Bloom Filters for Query Simulation," filed on Mar. 31, 2005;

U.S. patent application Ser. No. 11/097,690, "Selecting the Best Answer to a Fact Query from Among a Set of Potential Answers," filed on Mar. 31, 2005;

U.S. patent application Ser. No. 11/097,689, "User Interface for Facts Query Engine with Snippets from Information Sources that Include Query Terms and Answer Terms," filed on Mar. 31, 2005; and U.S. patent application Ser. No. 11/024,784, "Supplementing Search Results with Information of Interest," filed on Dec. 30, 2004.

TECHNICAL FIELD

The disclosed embodiments relate generally to fact databases, and more particularly, to corroboration of facts extracted from multiple sources.

BACKGROUND

The World Wide Web (also known as the "Web") and the web pages within the Web are a vast source of factual information. Users may look to web pages to get answers to factual questions, such as "what is the capital of Poland" or "what is the birth date of George Washington." Web search engines, however, may be unhelpful to users in this regard, as they generally do not provide a simple, succinct answer to factual queries such as the ones described above. Rather, Web search engines provide to the user a list of Web pages that are determined to match the query, and the user has to sort through the matching Web pages to find the answer.

Attempts that have been made to build search engines that that can provide quick answers to factual questions have their own shortcomings. For example, some search engines draw their facts from a single source, such as a particular encyclopedia. This limits the types of questions that these engines can answer. For instance, a search engine based on an encyclopedia is unlikely to be able to answer many questions concerning popular culture, such as questions about movies, songs or the like, and is also unlikely to be able to answer many questions about products, services, retail and wholesale businesses and so on. If the set of sources used by such a search engine were to be expanded, however, such expansion might introduce the possibility of multiple possible answers to a factual query, some of which might be contradictory or ambiguous. Furthermore, as the universe of sources expands, information may be drawn from untrustworthy sources or sources of unknown reliability.

SUMMARY

According to an aspect of the invention, a method for corroborating facts includes identifying one or more attribute-value pairs associated with a common subject; identifying a subset of the attribute-value pairs associated with the common subject, each of the attribute-value pairs in the subset meeting one or more predefined corroboration requirements; and performing a predefined action with respect to status of the identified subset of attribute-value pairs in a fact repository.

According to another aspect of the invention, a method for corroboration facts includes identifying one or more attribute-value pairs associated with a common subject; identifying a set of attributes from the identified attribute-value pairs, each of the attributes of the identified set meeting a first corroboration requirement; identifying a subset of the attribute-value pairs associated with the common subject, each of the attribute-value pairs in the subset having an attribute in the set of identified attributes and meeting a second corroboration requirement; and performing a predefined action with respect to the status of the identified subset of attribute-value pairs in a fact repository.

According to another aspect of the invention, a method for corroboration facts include identifying one or more attribute-value pairs associated with a common subject; identifying a set of candidate attributes from the identified attribute-value pairs; for each of the set of candidate attributes, determining a first score; identifying a subset of the set of candidate attributes, each of the subset of the set of candidate attributes having a respective first score exceeding a first predefined threshold; and for each of the subset of the set of candidate attributes: identifying one or more first candidate values associated with the respective candidate attribute; for each of the first candidate values, determining a second score; selecting a second candidate value of the first candidate values, the second candidate value being an only member of the first candidate values or having a respective second score exceeding second scores of other first candidate values by at least a predefined margin; and performing a predefined action with respect to a respective attribute-value pair having both the respective candidate attribute and the selected second candidate value.

BRIEF DESCRIPTION OF THE DRAWINGS

Like reference numerals refer to corresponding parts throughout the drawings.

DESCRIPTION OF EMBODIMENTS

Factual information from web pages may be extracted and stored in a facts database. The facts database may be used to provide answers to factual questions such as the ones described above. However, not every fact in a web page is acceptable for inclusion in the facts database. Some web pages may have facts that are unintentionally erroneous, due to typographical errors or outdated information, for example. Other web pages may have facts that are trivial, uninteresting or of potentially doubtful veracity. Furthermore, some web pages may purposely include outright falsehoods as "facts." In addition, content from a web page that is not factual information may be misidentified and extracted as facts. Storing these "facts" in the facts database would diminish the quality of the fact database.

Facts, associated with a particular subject, that are proper for inclusion in the fact repository may be identified by a process that corroborates the facts across documents that include facts associated with the particular subject. Furthermore, the number of corroborated facts in a document may be a basis for reducing the corroboration requirements for other facts in the same document.

Figure 1:
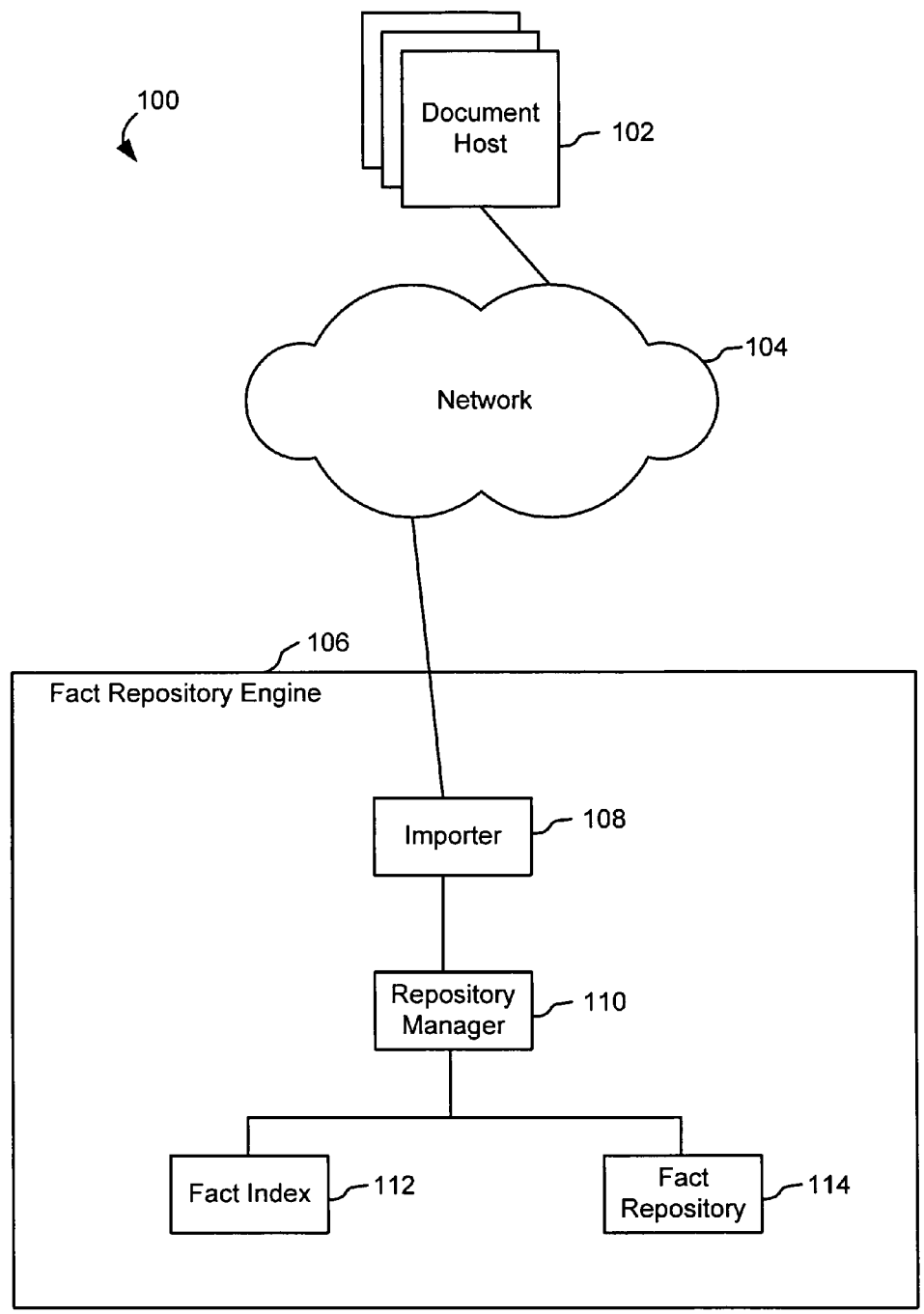
FIG. 1 is a block diagram illustrating a network, according to some embodiments of the invention.

FIG. 1 illustrates a network 100, according to some embodiments of the invention. Network 100 includes one or more document hosts 102 and a fact repository engine 106. The network 100 also includes one or more networks 104 that couple these components.

The document hosts 102 store documents and provide access to the documents. A document may be any machine-readable data including any combination of text, graphics, multimedia content, etc. In some embodiments, a document may be a combination of text, graphics and possible other forms of information written in the Hypertext Markup Language, i.e., web pages. A document may include one or more hyperlinks to other documents. A document may include one or more facts within its contents. A document stored in a document host 102 may be located and/or identified by a Uniform Resource Locator (URL), or Web address, or any other appropriate form of identification and/or location. Each document may also be associated with a page importance metric. The page importance metric of a document measures the importance, popularity or reputation of the document relative to other documents. In some embodiments, the page importance metric is the PageRank of the document. For more information on such the PageRank metric and its computation, see, for example, Lawrence et al., "The PageRank citation ranking: Bringing order to the web," Stanford Digital Libraries Working Paper, 1998; Haveliwala, "Topic-sensitive PageRank," Proceedings of the Eleventh International World Wide Web Conference, 2002; Richardson and Domingos, "The Intelligent Surfer: Probabilistic Combination of Link and Content Information in PageRank," volume 14. MIT Press, Cambridge, Mass., 2002; and Jeh and Widom, "Scaling personalized web search," *Stanford University Technical Report*, 2002; Brin and Page, "The Anatomy of a Large-Scale Hypertextual Search Engine," $7^{th}$ International World Wide Web Conference, Brisbane, Australia; and U.S. Pat. No. 6,285,999, each of which is hereby incorporated by reference in its entirety as background information.

The fact repository engine 106 includes an importer 108, a repository manager 110, a fact index 112, and a fact repository 114. The importer 108 extracts factual information from documents stored on document hosts 102. The importer 108 analyzes the contents of the documents stored in document host 102, determines if the contents include factual information and the subject or subjects with which the factual information are associated, and extracts any available factual information within the contents.

The repository manager 110 processes facts extracted by the importer 108. The repository manager 110 builds and manages the fact repository 114 and the fact index 112. The repository manager 110 receives facts extracted by the importer 108 and stores them in the fact repository 114. The repository manager 114 may also perform operations on facts in the fact repository 114 to "clean up" the data within the fact repository 114. For example, the repository manager 110 may look through the fact repository 114 to find duplicate facts (that is, facts that convey the exact same factual information) and merge them. The repository manager 110 may also normalize facts into standard formats. The repository manager 110 may also remove unwanted facts from the fact repository 114, such as facts related to pornographic content.

The fact repository 114 stores factual information extracted from a plurality of documents that are located on the document hosts 102. A document from which a particular fact may be extracted is a source document (or "source") of that particular fact. In other words, a source of a fact includes that fact within its contents. Sources documents may include, without limitation, Web pages. Within the fact repository 114, entities, concepts, and the like for which the fact repository 114 may have factual information stored are represented by objects. An object may have one or more facts associated with it. Each object is a collection of facts; an object that has no facts associated with it (an empty object) may be viewed as a non-existent object within the fact repository 114. Within each object, each fact associated with the object is stored as an attribute-value pair. Each fact also includes a list of source documents that include the fact within its contents and from which the fact was extracted. Further details about objects and facts in the fact repository are described below, in relation to FIG. 2.

The fact index 112 provides an index to the fact repository 114 and facilitates efficient lookup of information in the fact repository 114. The fact index 112 may index the fact repository 114 based on one or more parameters. For example, the fact index 112 may have an index that indexes unique terms to locations within the fact repository 114.

It should be appreciated that each of the components of the fact repository engine 106 may be distributed over multiple computers. For example, the fact repository 114 may be deployed over N servers, with a mapping function such as the "modulo N" function being used to determine which facts are stored in each of the N servers. Similarly, the fact index 112 may be distributed over multiple servers, and the importer 108 and repository manager 110 may each be distributed over multiple computers. However, for convenience of explanation, we will discuss the components of the fact repository engine 106 as though they were implemented on a single computer.

Figure 2:
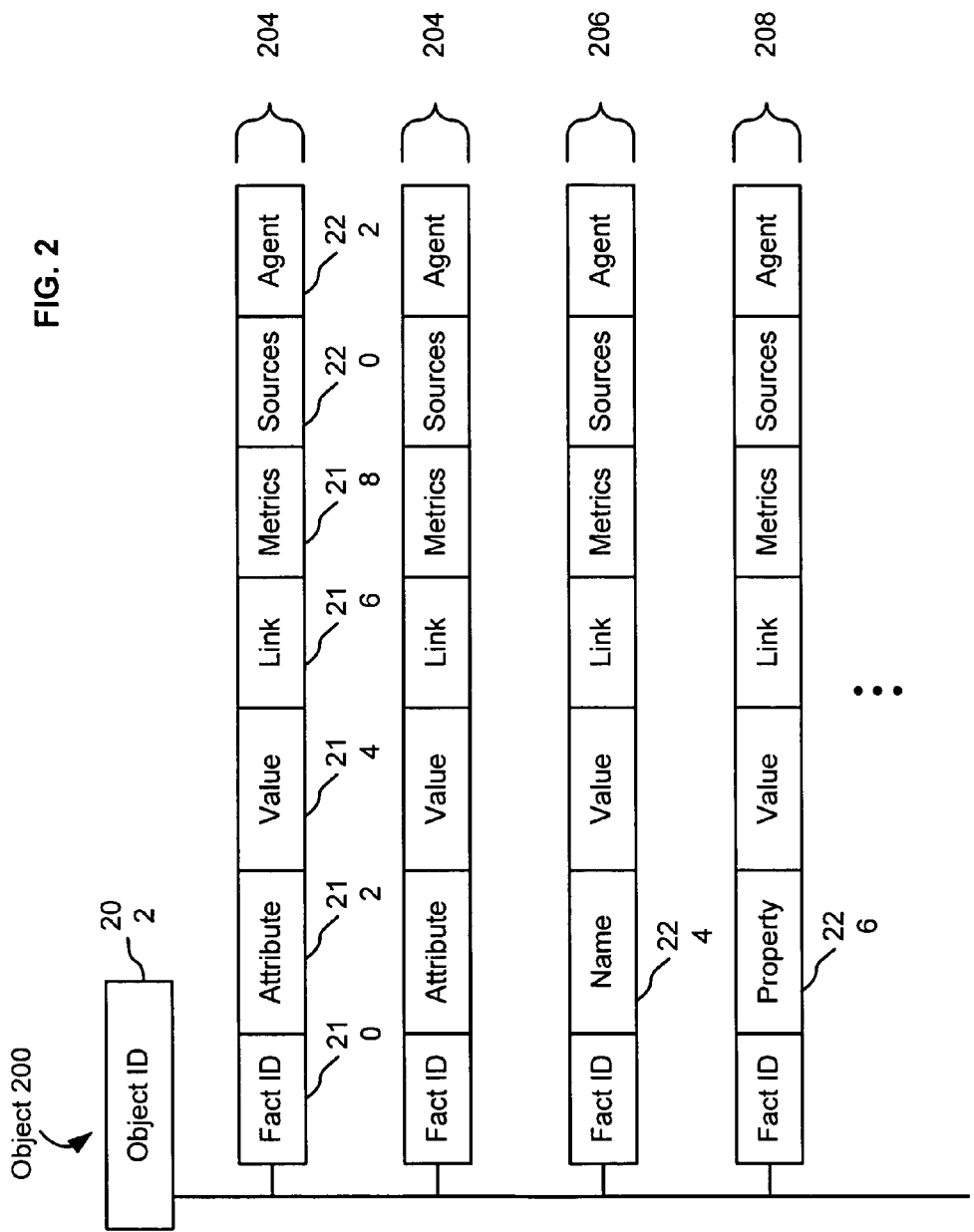
FIG. 2 is a diagram illustrating a data structure for an object and associated facts in a fact repository, according to some embodiments of the invention.

FIG. 2 illustrates an exemplary data structure for an object within the fact repository 114, according to some embodiments of the invention. As described above, the fact repository includes objects, each of which may include one or more facts. Each object 200 includes a unique identifier, such as the object ID 202. The object 200 includes one or more facts 204. Each fact 204 includes a unique identifier for that fact, such as a Fact ID 210. Each fact 204 includes an attribute 212 and a value 214. For example, facts included in an object representing George Washington may include facts having attributes of "date of birth" and "date of death," and the values of these facts would be the actual date of birth and date of death, respectively. A fact 204 may include a link 216 to another object, which is the object identifier, such as the object ID 202 of another object within the fact repository 114. The link 216 allows objects to have facts whose values are other objects. For example, for an object "United States," there may be a fact with the attribute "president" whose value is "George W. Bush,", with "George W. Bush" being another object in the fact repository 114. In some embodiments, the value field 214 stores the name of the linked object and the link 216 stores the object identifier of the linked object. In another embodiment, facts 204 do not include a link field 216 because the value 214 of a fact 204 may store a link to another object.

Each fact 204 also may include one or more metrics 218. The metrics may provide indications of the quality of the fact. In some embodiments, the metrics include a confidence level and an importance level. The confidence level indicates the likelihood that the fact is correct. The importance level indicates the relevance of the fact to the object, compared to other facts for the same object. The importance level may optionally be viewed as a measure of how vital a fact is to an understanding of the entity or concept represented by the object.

Each fact 204 includes a list of sources 220 that include the fact and from which the fact was extracted. Each source may be identified by a Uniform Resource Locator (URL), or Web address, or any other appropriate form of identification and/or location, such as a unique document identifier.

In some embodiments, some facts may include an agent field 222 that identifies the module that extracted the fact. For example, the agent may be a specialized module that extracts facts from a specific source (e.g., the pages of a particular web site, or family of web sites) or type of source (e.g., web pages that present factual information in tabular form), or a module that extracts facts from free text in documents throughout the Web, and so forth.

In some embodiments, an object 200 may have one or more specialized facts, such as a name fact 206 and a property fact 208. A name fact 206 is a fact that conveys a name for the entity or concept represented by the object 200. For example, for an object representing the country Spain, there may be a fact conveying the name of the object as "Spain." A name fact 206, being a special instance of a general fact 204, includes the same parameters as any other fact 204; it has an attribute, a value, a fact ID, metrics, sources, etc. The attribute 224 of a name fact 206 indicates that the fact is a name fact, and the value is the actual name. The name may be a string of text. An object 200 may have one or more name facts, as many entities or concepts can have more than one name. For example, an object representing Spain may have name facts conveying the country's common name "Spain" and the official name "Kingdom of Spain." As another example, an object representing the U.S. Patent and Trademark Office may have name facts conveying the agency's acronyms "PTO" and "USPTO" and the official name "United States Patent and Trademark Office."

A property fact 208 is a fact that conveys a statement about the entity or concept represented by the object 200 that may be of interest. For example, for the object representing Spain, a property fact may convey that Spain is a country in Europe. A property fact 208, being a special instance of a general fact 204, also includes the same parameters (such as attribute, value, fact ID, etc.) as other facts 204. The attribute field 226 of a property fact 208 indicates that the fact is a property fact, and the value field is a string of text that conveys the statement of interest. For example, for the object representing Spain, the value of a property fact may be the text string "is a country in Europe." Some objects 200 may have one or more property facts while other objects may have no property objects.

It should be appreciated that the data structure illustrated in FIG. 2 and described above is merely exemplary. The data structure of the fact repository 114 may take on other forms. Other fields may be included in facts and some of the fields described above may be omitted. Additionally, each object may have additional special facts aside from name facts and property facts, such as facts conveying a type or category (for example, person, place, movie, actor, etc.) for categorizing the entity or concept represented by the object. In some embodiments, an object's name(s) and/or properties are represented by special records that have a different format than the facts records 204 associated with the attribute-value pairs of an object.

Figure 3:
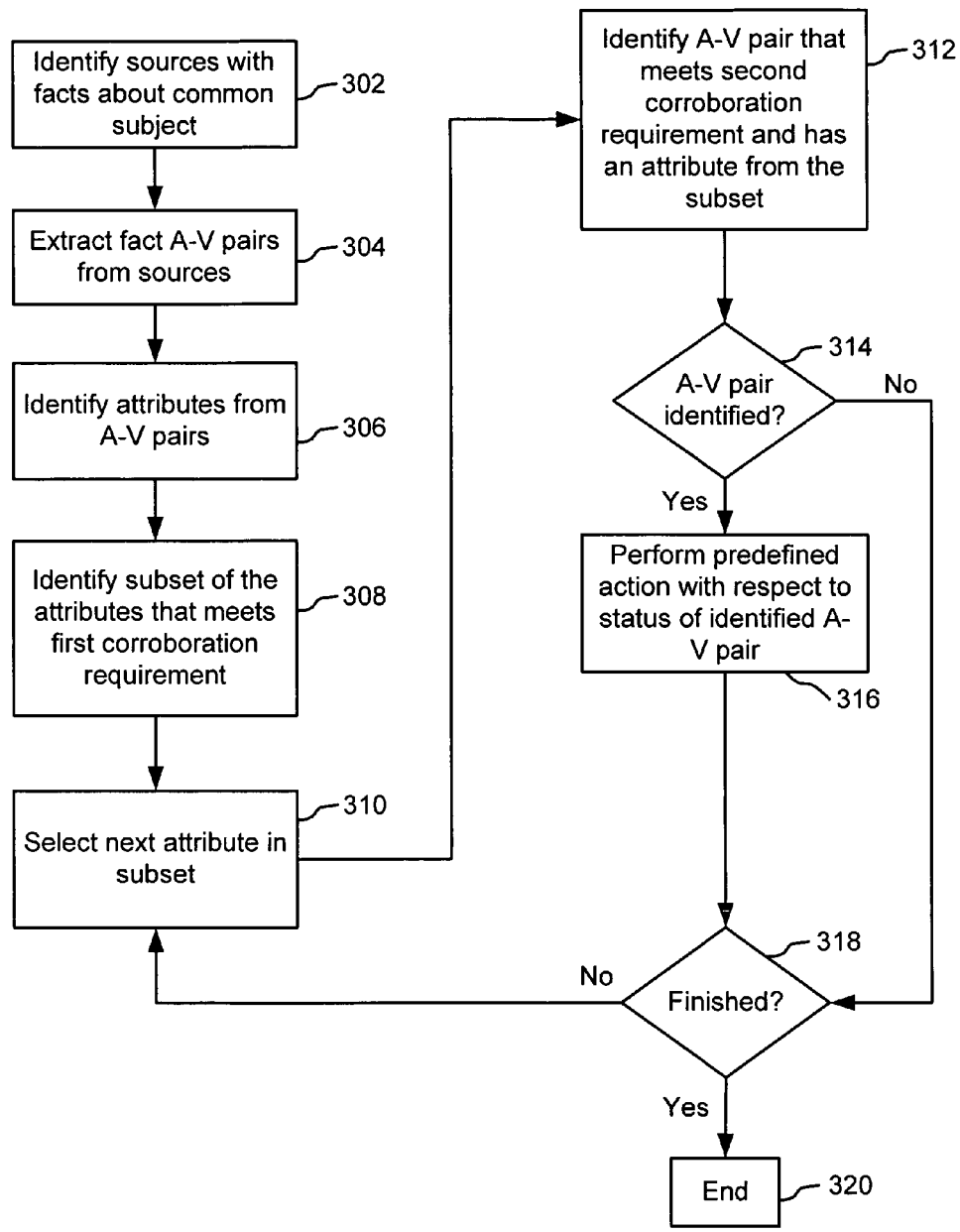
FIG. 3 is a flow diagram illustrating a process for corroborating facts, according to some embodiments of the invention.

FIG. 3 illustrates an exemplary process for corroborating facts, according to some embodiments of the invention. In some embodiments, the corroboration process may be performed on facts that have been extracted from sources but are awaiting storage into the fact repository 114. In these embodiments, facts that have been corroborated are stored in the fact repository 114. In alternative embodiments, the corroboration process may be performed on facts already stored in the fact repository 114. In these embodiments, the corroborated facts may be marked for retention or accessibility in the fact repository 114, or the uncorroborated facts may be marked for removal or denial of access.

One or more sources that include one or more facts associated with a common subject are identified (302). In other words, documents that include factual information are grouped according to the subject of the factual information included in each document. In some embodiments, the subject with which the facts included in a source are associated may be identified by analyzing the source' content, such as the title text. In some other embodiments, the subject with which the facts included in a source are associated may be identified by analyzing the anchor text of hyperlinks from other documents to the source. Each distinct anchor text (or each distinct subject extracted from the anchor text of the hyperlinks to the source) may be given a weighted score based on how many documents have a hyperlink to the source with the same anchor text (or the same subject extracted from the anchor text) and the page importance metrics of those documents. The anchor text (or the subject extracted from the anchor text) with the highest score is determined to be the subject (or object name) associated with the facts extracted from the source.

From the sources including facts associated with a common subject, one or more attribute-value pairs (hereinafter "A-V pairs") associated with the common subject are extracted (304). For convenience, this document may use the shorthand phrase "A-V pairs in a selected source" (and other similar phrases) to mean facts or attribute-value pairs extracted from or otherwise derived from the selected source. One or more attributes are identified from the extracted A-V pairs (306). A subset of the identified attributes, where each member of the subset meets a first corroboration requirement, is identified (308). In some embodiments, the first corroboration requirement is based on the number of sources that include at least one A-V pair that has the particular attribute. In other words, the first corroboration requirement looks for facts about the common subject with attributes that may be important with regard to the common subject, based on the frequency of appearance of facts with particular attribute across sources. For example, the first corroboration requirement may be that at least four (or more generally, N, where N is an integer greater than 1) independent sources (e.g., from different web sites) be the source of A-V pairs having the same attribute.

In some embodiments, each attribute identified at 306 is given a first source count score and the first source count score is tested against a first predefined threshold. The first source count score for an attribute is the number of independent sources that include at least one A-V pair that has the particular attribute. The first predefined threshold represents the first corroboration requirement, namely a minimum number of sources that includes an A-V pair with the particular attribute. To reduce "gaming" of the facts repository by persons or entities attempting to insert biased, dubious and false information into the facts repository by positing a few web pages containing such information, the count of sources may exclude documents (e.g., web pages) from the same web site as a document already included in the count, and may also exclude duplicates and near-duplicates of documents already included in the count. Other techniques may also be used to reduce gaming of the facts repository, and some of these techniques may be incorporated into the first corroboration requirement and/or the second corroboration requirement (discussed below). For example, the incorporation of a page importance-weighted score in the second corroboration requirement (as discussed below) may help to reduce gaming of the facts repository by favoring facts from sources of higher importance (with importance being a proxy for the reliability of a source).

In some embodiments, the first corroboration requirement may be based on a number of sources that include at least one A-V pair that has the particular attribute or any of its synonymous or equivalent attributes. Synonymous or equivalent attributes of an attribute convey the same concept as the respective attribute. For example, attributes "birthdate" and "birthday" are synonymous with or equivalent to the attribute "date of birth," because they both convey the same concept, namely the date when a person was born. In some embodiments, synonymous or equivalent attributes are identified by comparing the attributes identified at 306 to each other and determining a degree of similarity based on each comparison. Attributes whose degrees of similarity are above a predefined similarity threshold are deemed to be synonymous or equivalent.

After the subset of attributes that satisfy the first corroboration requirement is identified, one of the attributes is selected (310). For that selected attribute, an A-V pair that includes the selected attribute and satisfies a second corroboration requirement is identified (312). The identified A-V pair that satisfies the second corroboration requirement (and also satisfies the first corroboration requirement because it includes an attribute that satisfies the first corroboration requirement) may be said to be an "accepted" A-V pair. In some embodiments, the second corroboration requirement is based on the number of sources that include the particular A-V pair and on a comparison of the page importance-weighted score of the particular A-V pair against page importance-weighted scores of other A-V pairs that include the selected attribute but a different value. The second corroboration requirements looks for the "most correct" value for the selected attribute, with regard to the common subject, based on the frequency of appearance of the particular value in A-V pairs that include the selected attribute across documents and the importance of the sources that include the A-V pair with the selected attribute and the particular value. In other words, the second corroboration requirement is that the A-V pair with the selected attribute and the particular value appears in at least a minimum number of sources and has a page importance-weighted score that is "lopsided" compared to page importance-weighted scores of other A-V pairs with the selected attribute but different values.

In some embodiments, for the selected attribute, one or more values are identified. The identified values are values that are included in A-V pairs that include the selected attribute. A second source count score that is the number of sources that includes the A-V pair having the selected attribute and the particular identified value is determined. In some embodiments, the second source count score is the number of sources that includes the A-V pair having the selected attribute (or its synonymous/equivalent attributes) and the particular identified value or its synonymous/equivalent values. Synonymous/equivalent values are similar to synonymous/equivalent attributes. Grouping of synonymous/equivalent values are based on degrees of similarity determined from comparisons of the identified values to each other, similar to the grouping of synonymous/equivalent attributes, as described above. In some embodiments, the function for computing the second source count score is:

$$\text{Count Score}(A-V) = \sum_{\text{sources of } A-V} 1$$

As noted above with respect to the first corroboration requirement, in some embodiments the sources of an A-V pair included in the score computations (including the score computations discussed below) for evaluating the second corroboration requirement may be restricted in various ways to reduce gaming of the facts repository. The second source count score is tested against a second predefined threshold. For those A-V pairs whose second source count scores satisfy the second predefined threshold, a page importance-weighted score is determined. In some embodiments, the page importance-weighted score is the sum of the page importance metrics of the sources that include the A-V pair having the selected attribute (or its synonymous/equivalent attributes) and the particular value (or its synonymous/equivalent values). In some embodiments, the function for computing the page importance-weighted score is:

$$\text{Score}(A-V) = \sum_{\text{sources of } A-V} \text{page-importance(source)}$$

In some other embodiments, the page importance-weighted score may be the average of the page importance metrics of the sources that include the A-V pair having the selected attribute (or its synonymous/equivalent attributes) and the particular value (or its synonymous/equivalent values). In some embodiments, the function for computing this version of the page importance-weighted score is:

$$\text{Score}(A-V) = \frac{1}{K} \sum_{\text{sources of } A-V} \text{page-importance(source)},$$

where K is the number of sources of the A-V pair included in the score computation.

The page importance-weighted scores of the A-V pairs whose second source count scores exceed the second predefined threshold are compared against each other. The A-V pair having the largest page importance-weighted score over each of the other page importance-weighted scores by at least a predefined margin is the A-V pair that satisfies the second corroboration requirement, i.e., the accepted A-V pair. In some embodiments, the predefined margin may be defined by the inequality $S > \alpha C + \beta$, where S is the page importance-weighted score of an A-V pair, C is the page importance-weighted score of another A-V pair, and $\alpha$ and $\beta$ are predefined constants. In some embodiments, $\alpha$ may be set to a positive number greater than 1, such as a number between 2 and 5, inclusive, and $\beta$ may be set to 0.

Thus, in some embodiments, the second corroboration requirement is both that the second source count score is above the second predefined threshold and that the page importance-weighted score is greater than other page importance-weighted scores by at least the predefined margin.

It may be the case that an A-V pair is the only one whose second source count score exceeds the second predefined threshold. In some embodiments, such an A-V pair may be accepted without performing the comparison of page importance-weighted scores.

It should be appreciated that while the description above describes scoring A-V pairs based on source count and page importance, in other embodiments the values in A-V pairs with a particular attribute are scored based on source count and page importance. In these cases, the practical effect is the same: A-V pairs are scored based on source count and the page importance of the sources of the A-V pairs.

If an accepted A-V pair is identified (314—yes), a predefined action may be performed (316) with respect to the A-V pair and/or with respect to its status in the fact repository 114. In some embodiments, the predefined action is to store the A-V pair in the fact repository 114 as a fact 204 associated with an object 202. In other embodiments, the predefined action may be to mark the A-V pair, if already stored in the fact repository 114, as proper for retention in the fact repository 114 and/or proper for access. Other A-V pairs having the same attribute may be marked for deletion from the fact repository, or may be marked as being unavailable for retrieval in response to a fact search query. If an accepted A-V pair is not identified (314—no), or after completion of the predefined action at 316, if there are further attributes in the subset remaining to be processed (318—no), another attribute in the subset is selected (310). If there are no attributes in the subset remaining to be processed (318—yes), then the process may end (320).

It may be the case that, for an attribute that meets the first corroboration requirement, there may not be an A-V pair that meets the second corroboration requirement, and thus leading to the non-identification of an accepted A-V pair. In some embodiments, the reason for this may be that no A-V pair with that particular attribute has a second source count score greater than the second predefined threshold, or that no A-V pair with that particular attribute has a page importance-weighted score that is greater than the page importance-weighted scores of other A-V pairs with that particular attribute by the predefined margin.

Figure 4A:
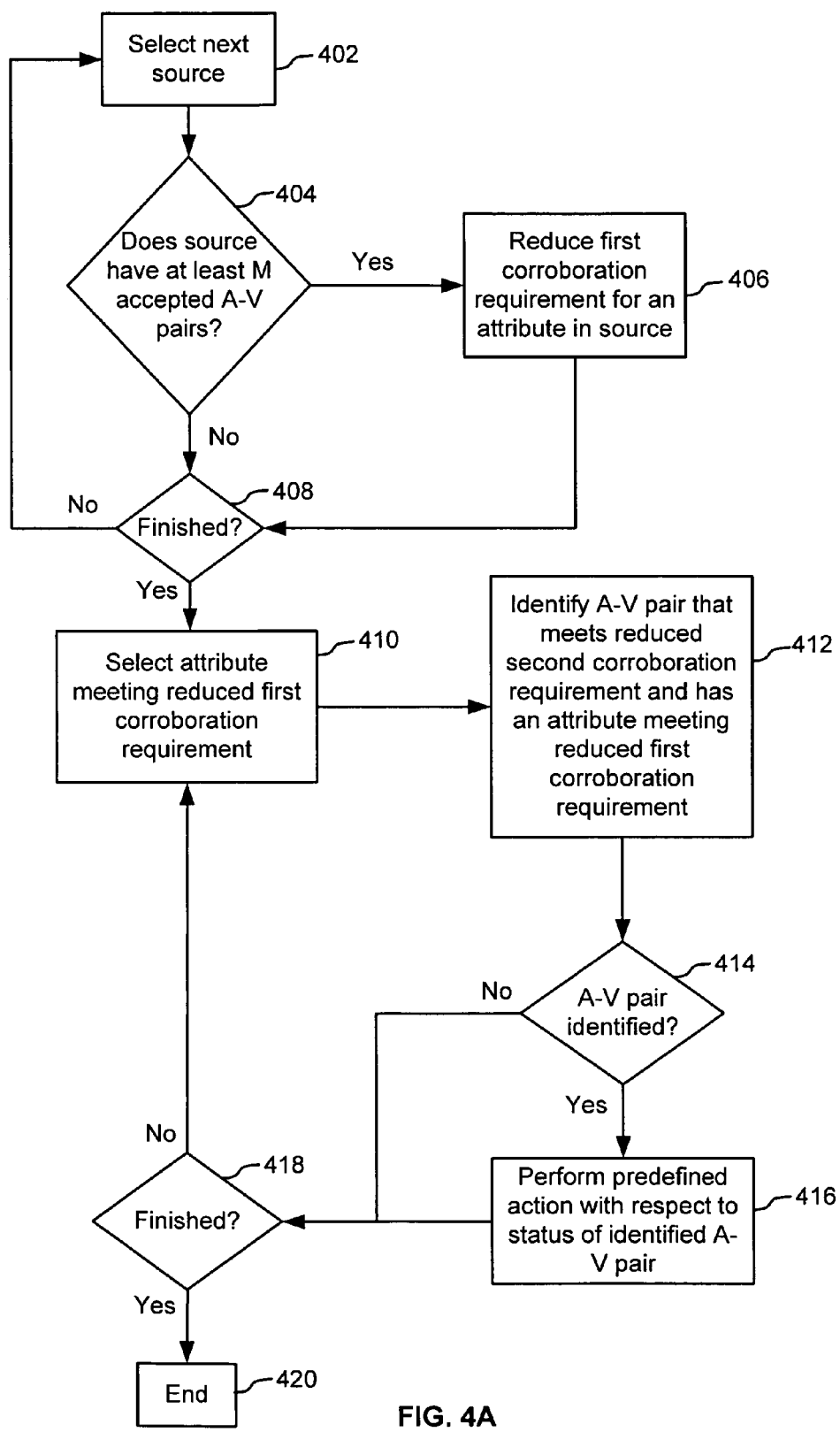
FIG. 4A is a flow diagram illustrating one process for corroborating facts under reduced requirements, according to some embodiments of the invention.

FIG. 4A illustrates an exemplary process for corroborating facts under reduced requirements, according to some embodiments of the invention. A source that includes extracted A-V pairs is selected (402). If that source has at least a predefined number M of accepted A-V pairs (404—yes), then the first corroboration requirement for attributes in non-accepted A-V pairs in the selected source is reduced (406). In some embodiments, the first corroboration requirement is reduced by counting the selected source as two sources in the first source count scores of attributes in A-V pairs derived from the selected source. More generally, the selected source may be treated as N sources for purposes of evaluating the first corroboration requirements, where N is a value (not necessarily an integer) greater than 1. This adjustment may be performed for attributes that otherwise failed to pass the first corroboration requirement. In other words, the first source count scores of those attributes are positively adjusted. In some other embodiments, the first corroboration requirement may be reduced by lowering the first predefined threshold.

If there are more sources that have at least M accepted A-V pairs (408—no), another source is selected (402). If there are no more sources remaining to select (408—yes), an attribute that met the reduced first corroboration requirement is selected (410). An A-V pair that includes the selected attribute and meets a reduced second corroboration requirement is identified (412). If one is identified (414—yes), a predefined action may be performed with respect to it and/or with respect to its status in the fact repository 114 (416). Operations 412, 414, and 416 are the same as operations 312, 314, and 316, respectively, as described above, except that in operation 412 the second corroboration requirement is reduced for A-V pairs having the selected attribute. In some embodiments, the second corroboration requirement is reduced by counting a source that include the A-V pair having the selected attribute and at least M accepted A-V pairs as two sources (or more generally, as N sources, where N is a value greater than 1). In other words, the second source count scores and the page importance-weighted scores of those A-V pairs with the selected attribute are positively adjusted. In some other embodiments, the second corroboration requirement may be reduced by lowering the second predefined threshold or reducing the predefined margin.

If an accepted A-V pair is not identified (414—no), or after completion of operation 416, if there are other attributes to be processed (418—no), then another attribute is selected (410). Otherwise (418—yes), the process may end.

Figure 4B:
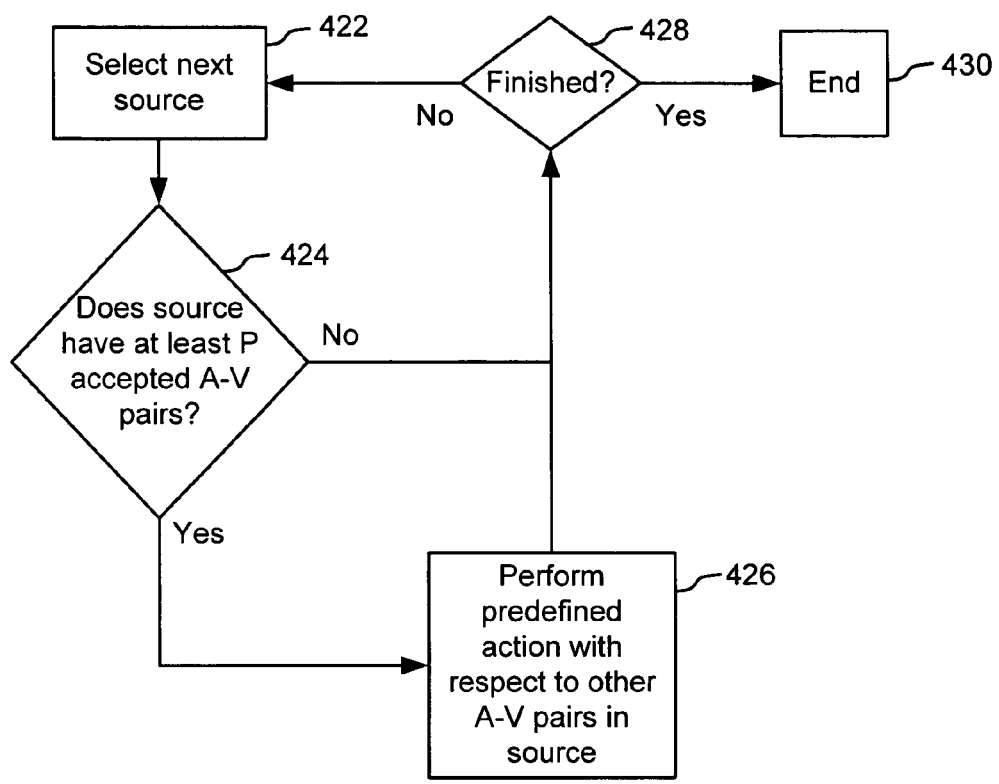
FIG. 4B is a flow diagram illustrating another process for corroborating facts under reduced requirements, according to some embodiments of the invention.

FIG. 4B illustrates another exemplary process for corroborating facts under reduced requirements, according to some embodiments of the invention. A source of extracted A-V pairs is selected (422). If that source has at least a predefined number P of accepted A-V pairs (424—yes), then the (previously) non-accepted A-V pairs in the selected source are accepted and the predefined action may be performed with respect to them and/or with respect to their status in the fact repository 114 (426). P may be any appropriate value greater than 1; for example, P may be a predefined value between four and ten. In other words, for the non-accepted A-V pairs derived from the selected source, the first and second corroboration requirements are eliminated entirely. If the selected source does not have at least P accepted A-V pairs (424—no), or after completion of the predefined action at 426, then if there are still sources to process (428—no), another source is selected (422). Otherwise (428—yes), the process may end (430).

Thus, as described above, the acceptance of facts in the initial processing may be used as an indication of the reliability and trustworthiness of a source. When a source meets a predefined reliability requirement, other facts extracted from the same source that have not yet been accepted may be accepted, or given a second opportunity to be accepted, even though those facts would otherwise fail to meet one or more corroboration requirements. In the process of FIG. 4A, that a source includes at least a certain number M of accepted facts is an indication of the relative reliability and trustworthiness of the source. Based on that indication of reliability and trustworthiness, corroboration requirements for other facts in the same source are reduced and those facts are provided a second opportunity at being accepted for the fact repository 114. In the process of FIG. 4B, that a source includes at least certain number P of accepted facts is an indication that the source is of such high reliability and trustworthiness that the corroboration requirements for other facts from the same source may be eliminated entirely. In some embodiments, P is a number greater than M, to reflect a more stringent threshold required for outright elimination of corroboration requirements for facts derived or extracted from a source.

In some embodiments, the corroboration process may be performed in three phases. For example, the processes described above, in relation to FIGS. 3, 4A, and 4B may be performed sequentially, with an initial fact acceptance phase (represented, for example, by FIG. 3), a second phase (represented, for example, by FIG. 4A) where corroboration requirements are reduced for some facts, and a third phase (represented, for example, by FIG. 4B) where the corroboration requirements are eliminated for some facts.

In some embodiments, the corroboration process may be performed on facts already stored in the fact repository 114, rather than before the extracted facts are stored in the fact repository 114. The process is similar to that described above. In some embodiments, the predefined action may be to mark an accepted fact as accepted. Afterwards, the repository manager, while removing unwanted facts, may keep accepted facts in the fact repository 114 unless other criteria mandate removal. In some other embodiments, the predefined action may be to mark the fact as accessible. Facts that are so marked may be accessed (for example, while processing a search query), while facts not marked are not accessible, even if they remain in the fact repository 114.

Figure 5:
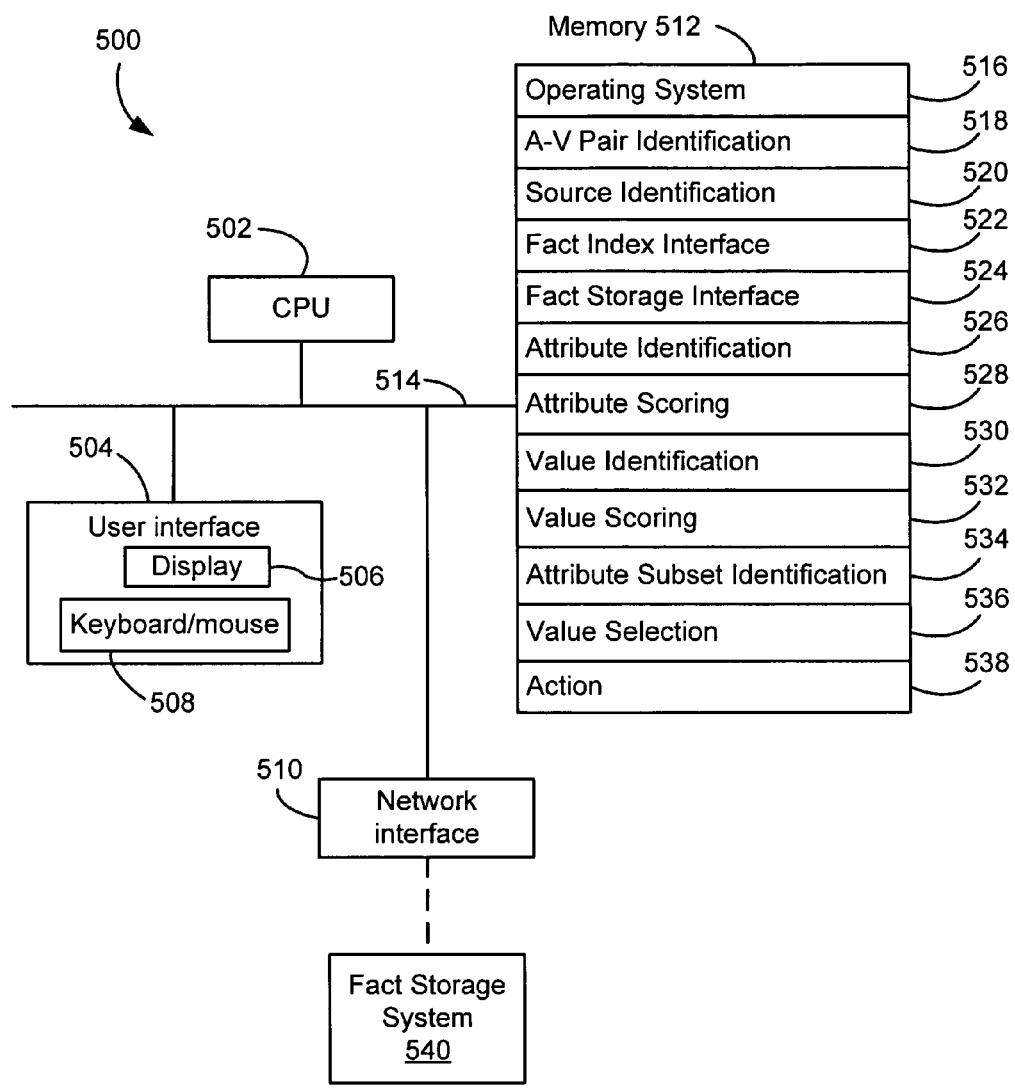
FIG. 5 is a diagram illustrating a fact repository system, according to some embodiments of the invention.

FIG. 5 is a block diagram illustrating a fact repository system 500 in accordance with some embodiments of the invention. The fact repository system 500 typically includes one or more processing units (CPU's) 502, one or more network or other communications interfaces 510, memory 512, and one or more communication buses 514 for interconnecting these components. The fact repository system 500 optionally may include a user interface 504 comprising a display device 506 and a keyboard/mouse 508. The memory 512 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 512 may optionally include one or more storage devices remotely located from the CPU(s) 502. In some embodiments, the memory 512 stores the following programs, modules and data structures, or a subset thereof:

- an operating system 516 that includes procedures for handling various basic system services and for performing hardware dependent tasks;
- an A-V pair identification module (or program or set of instructions) 518 for extracting and identifying A-V pairs;
- a source identification module (or program or set of instructions) 520 for identifying sources and the subjects associated with the A-V pairs extracted from those sources, and for grouping sources that include facts associated with a common subject;
- a fact index interface (or program or set of instructions) 522 for interfacing with the fact index;
- a fact storage interface (or program or set of instructions) 524 for interfacing with a fact storage system;
- an attribute identification module (or program or set of instructions) 526 for identifying attributes from A-V pairs;
- an attribute scoring module (or program or set of instructions) 528 for scoring attributes;
- a value identification module (or program or set of instructions) 530 for identifying A-V pairs with particular values;
- a value scoring module (or program or set of instructions) 532 for scoring A-V pairs with particular values;
- an attribute subset identification module (or program or set of instructions) 534 for identifying attributes with scores that meet the first corroboration requirement;
- a value selection requirement 536 for identifying A-V pairs with particular values and with scores that meet the second corroboration requirement; and
- an action module (or program or set of instructions) 538 for performing the predefined action with respect to accepted attribute-value pairs and/or with respect to their status in the fact repository 114.

In some embodiments, memory 512 of system 500 includes the fact index instead of an interface 532 to the fact index. The system 500 also includes a fact storage system 540 for storing facts. Each fact stored in the fact storage system 540 includes a corresponding list of sources from which the respective fact was extracted.

It should be appreciated that at least some of the modules described above may be grouped together as one module. For example, the modules 526, 528, and 534 may be grouped into a first corroboration module.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 512 may store a subset of the modules and data structures identified above. Furthermore, memory 512 may store additional modules and data structures not described above.

Although FIG. 5 shows a "fact repository system," FIG. 5 is intended more as functional description of the various features which may be present in a set of servers than as a structural schematic of the embodiments described herein. In practice, and as recognized by those of ordinary skill in the art, items shown separately could be combined and some items could be separated. For example, some items shown separately in FIG. 5 could be implemented on single servers and single items could be implemented by one or more servers. The actual number of servers used to implement a fact repository system and how features are allocated among them will vary from one implementation to another, and may depend in part of the amount of information stored in the facts repository, in part on the number of sources or potential sources of facts to be processed, and in part on the amount of data traffic that the system must handle during peak usage periods as well as during average usage periods.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer-implemented method for corroborating facts, comprising:

at a computer system including one or more processors and memory storing one or more programs, the one or more processors executing the one or more programs to perform the operations of:

identifying a plurality of source documents including facts associated with a common subject;

identifying, from the plurality of source documents, one or more attribute-value pairs associated with the common subject;

corroborating a fact, comprising a respective attribute-value pair of the one or more attribute-value pairs associated with the common subject, by determining that the respective attribute-value pair meets one or more predefined corroboration requirements; and in response to corroboration of the fact, updating a status of the respective attribute value pair in a fact repository;

wherein corroborating the fact includes:

determining that a respective attribute of the respective attribute-value pair meets a first corroboration requirement; and determining that the respective attribute-value pair meets a second corroboration requirement.

2. The method of claim 1, wherein the first corroboration requirement with respect to the respective attribute is based on a number of source documents having at least one attribute-value pair associated with the common subject, wherein the attribute of the attribute-value pair comprises the respective attribute.

3. The method of claim 1, wherein the second corroboration requirement with respect to the respective attribute-value pair is based on a number of source documents having the respective attribute-value pair associated with the common subject.

4. The method of claim 1, wherein the second corroboration requirement with respect to the respective attribute-value pair is based on a number of source documents having the particular attribute-value pair associated with the common subject and respective importance metrics of the source documents.

5. The method of claim 1, further comprising reducing the first corroboration requirement with respect to an attribute of an attribute-value pair in a source document, when the source document includes at least a first predefined number of attribute-value pairs meeting the second corroboration requirement.

6. The method of claim 1, further comprising reducing the second corroboration requirement with respect to a first attribute-value pair in a source document, when the source document includes at least a second predefined number of other attribute-value pairs meeting the second corroboration requirement.

7. A computer-implemented method for corroborating facts, comprising:

at a computer system including one or more processors and memory, the memory of the computer system storing one or more programs to be executed by the one or more processors of the computer system, identifying a plurality of source documents including facts associated with a common subject;

identifying, from the plurality of source documents, one or more attribute-value pairs associated with the common subject;

corroborating a fact, comprising a respective attribute-value pair of the one or more attribute-value pairs associated with the common subject, by:

identifying a candidate attribute from the identified attribute-value pairs;

determining a first score based on the candidate attribute;

determining that the first score exceeds a first predefined threshold;

identifying a candidate value associated with the candidate attribute;

determining a second score based on the candidate attribute and the candidate value;

determining that the second score exceeds second scores of other candidate values by at least a predefined margin; and in response to corroboration of the fact, updating a status of the respective attribute-value pair in a fact repository.

8. A system for corroborating facts, comprising:

one or more processors;

memory; and one or more programs stored in the memory, the one or more programs comprising instructions to:

identifying a plurality of source documents including facts associated with a common subject;

identify, from the plurality of source documents, one or more attribute-value pairs associated with the common subject;

corroborate a fact, comprising a respective attribute-value pair of the one or more attribute-value pairs associated with the common subject, by determining that the respective attribute-value pair meets one or more predefined corroboration requirements; and in response to corroboration of the fact, updating a status of the respective attribute value pair in a fact repository;

wherein the instructions to corroborate a fact includes instructions to:

determine that a respective attribute of the respective attribute-value pair meets a first corroboration requirement; and determining that the respective attribute-value pair meets a second corroboration requirement.

9. The system of claim 8, wherein the first corroboration requirement with respect to the respective attribute is based on a number of source documents having at least one attribute-value pair associated with the common subject, wherein the attribute of the attribute-value pair comprises the respective attribute.

10. The system of claim 8, wherein the second corroboration requirement with respect to the respective attribute-value pair is based on a number of source documents having the respective attribute-value pair associated with the common subject.

11. The system of claim 8, wherein the second corroboration requirement with respect to the respective attribute-value pair is based on a number of source documents having the particular attribute-value pair associated with the common subject and respective importance metrics of the source documents.

12. The system of claim 8, wherein the instructions to corroborate a fact further includes instructions to reduce the first corroboration requirement with respect to an attribute of an attribute-value pair in a source document, when the source document includes at least a first predefined number of attribute-value pairs meeting the second corroboration requirement.

13. The system of claim 8, wherein instructions to corroborate a fact further includes instructions to reduce the second corroboration requirement with respect to a first attribute-value pair in a source document, when the source document includes at least a second predefined number of other attribute-value pairs meeting the second corroboration requirement.

14. A system for corroborating facts, comprising:

one or more processors;

memory; and one or more programs stored in the memory, the one or more programs comprising instructions to:

identify a plurality of source documents including facts associated with a common subject;

identify, from the plurality of source documents, one or more attribute-value pairs associated with the common subject;
corroborate a fact, comprising a respective attribute-value pair of the one or more attribute-value pairs associated with the common subject, wherein the instructions to corroborate the fact include instructions to:
identify a candidate attribute from the identified attribute-value pairs;
determine a first score based on the candidate attribute;
determining that the first score exceeds a first predefined threshold;
identify a candidate value associated with the candidate attribute;
determine a second score based on the candidate attribute and the candidate value;
determine that the second score exceeds second scores of other candidate values by at least a predefined margin; and
in response to corroboration of the fact, update a status of the respective attribute-value pair in a fact repository.

15. A computer program product for use in conjunction with a computer system, the computer program product comprising a computer readable storage medium and a computer program mechanism embedded therein, the computer program mechanism comprising:
identifying a plurality of source documents including facts associated with a common subject;
identifying, from the plurality of source documents, one or more attribute-value pairs associated with the common subject;
corroborating a fact, comprising a respective attribute-value pair of the one or more attribute-value pairs associated with the common subject, by determining that the respective attribute-value pair meets one or more predefined corroboration requirements; and
in response to corroboration of the fact, updating a status of the respective attribute value pair in a fact repository;
wherein corroborating the fact includes:
determining that a respective attribute of the respective attribute-value pair meets a first corroboration requirement; and
determining that the respective attribute-value pair meets a second corroboration requirement.

16. The computer program product of claim 15, wherein the first corroboration requirement with respect to the respective attribute is based on a number of source documents having at least one attribute-value pair associated with the common subject, wherein the attribute of the attribute-value pair comprises the respective attribute.

17. The computer program product of claim 15, wherein the second corroboration requirement with respect to the respective attribute-value pair is based on a number of source documents having the respective attribute-value pair associated with the common subject.

18. The computer program product of claim 15, wherein the second corroboration requirement with respect to the respective attribute-value pair is based on a number of source documents having the respective attribute-value pair associated with the common subject and respective importance metrics of the source documents.

19. The computer program product of claim 15, further comprising reducing the first corroboration requirement with respect to an attribute of an attribute-value pair in a source document, when the source document includes at least a first predefined number of attribute-value pairs meeting the second corroboration requirement.

20. The computer program product of claim 15, further comprising reducing the second corroboration requirement with respect to a first attribute-value pair in a source document, when the source document includes at least a second predefined number of other attribute-value pairs meeting the second corroboration requirement.

21. A computer program product for use in conjunction with a computer system, the computer program product comprising a computer readable storage medium and a computer program mechanism embedded therein, the computer program mechanism comprising:
identifying a plurality of source documents including facts associated with a common subject;
identifying, from the plurality of source documents, one or more attribute-value pairs associated with the common subject;
corroborating a fact, comprising a respective attribute-value pair of the one or more attribute-value pairs associated with the common subject, by:
identifying a candidate attribute from the identified attribute-value pairs;
determining a first score based on the candidate attribute;
determining that the first score exceeds a first predefined threshold;
identifying a candidate value associated with the candidate attribute;
determining a second score based on the candidate attribute and the candidate value;
determining that the second score exceeds second scores of other candidate values by at least a predefined margin; and
in response to corroboration of the fact, updating a status of the respective attribute-value pair in a fact repository.

* * * * *